US012149009B2

(12) United States Patent
Hara et al.

(10) Patent No.: US 12,149,009 B2
(45) Date of Patent: Nov. 19, 2024

(54) ANTENNA MODULE

(71) Applicant: TDK Corporation, Tokyo (JP)

(72) Inventors: Yasuyuki Hara, Tokyo (JP); Tomoyuki Goi, Tokyo (JP)

(73) Assignee: TDK Corporation, Tokyo (JP)

( * ) Notice: Subject to any disclaimer, the term of this patent is extended or adjusted under 35 U.S.C. 154(b) by 135 days.

(21) Appl. No.: 17/900,179

(22) Filed: Aug. 31, 2022

(65) Prior Publication Data

US 2023/0065767 A1 Mar. 2, 2023

(30) Foreign Application Priority Data

Sep. 1, 2021 (JP) ................................ 2021-142393
Aug. 3, 2022 (JP) ................................ 2022-123841

(51) Int. Cl.
*H01Q 9/04* (2006.01)
*H01Q 1/22* (2006.01)
*H01Q 5/314* (2015.01)

(52) U.S. Cl.
CPC ......... *H01Q 9/0407* (2013.01); *H01Q 1/2283* (2013.01); *H01Q 5/314* (2015.01)

(58) Field of Classification Search
CPC .................................................... H01Q 1/2283
See application file for complete search history.

(56) References Cited

U.S. PATENT DOCUMENTS

2011/0163919 A1* 7/2011 Suzuki ................. H05K 1/0237 361/818
2014/0268614 A1* 9/2014 Zhang ................... H01L 21/768 174/262
2019/0089048 A1* 3/2019 Kanar ....................... H03F 3/19
2019/0307010 A1* 10/2019 Zhang .................. H05K 7/1069
2020/0106194 A1 4/2020 Takaki
2020/0161767 A1 5/2020 Hara et al.
2021/0075088 A1* 3/2021 Edwards .............. H01Q 1/2283
2021/0368615 A1* 11/2021 Snir ..................... H05K 1/0251

FOREIGN PATENT DOCUMENTS

GB 2615615 A * 8/2023 ............... B81B 7/00
JP 11-135667 A 5/1999
JP 6777136 B2 10/2020
WO 2018/221403 A1 12/2018

* cited by examiner

*Primary Examiner* — Seokjin Kim
(74) *Attorney, Agent, or Firm* — Rimon P.C.

(57) ABSTRACT

Disclosed herein is an antenna module that includes solder balls provided on a surface of the element body having an antenna element. The solder balls include a signal ball disposed at an intersection between the second row virtual line and the second column virtual line and first to fourth ground balls disposed, out of a plurality of intersections between the first to third row virtual lines and the first to third column virtual lines, at any of intersections other than those at which the signal ball is disposed. No solder ball is disposed, out of the intersections between the plurality of row and column virtual lines, at least at some of the plurality of intersections other than those at which the first signal ball or first to fourth ground balls are disposed.

9 Claims, 23 Drawing Sheets

ANTENNA MODULE

CROSS-REFERENCE TO RELATED APPLICATION

This application claims the benefit of Japanese Patent Application No. 2021-142393, filed on Sep. 1, 2021 and Japanese Patent Application No. 2022-123841, filed on Aug. 3, 2022, the entire disclosures of which are incorporated by reference herein.

BACKGROUND

The present disclosure relates to an antenna module.

Japanese Patent No. 6,777,136 discloses an antenna module having a structure in which pad electrodes are arranged in an array on the surface of an element body.

However, when a solder ball is mounted on all the pad electrodes, material cost increases disadvantageously.

SUMMARY

An antenna module according to one embodiment of the present disclosure includes an element body including a first antenna element and a plurality of solder balls provided on the surface of the element body. The plurality of solder balls are disposed at intersections between a plurality of row virtual lines extending in a first direction on the surface of the element body and arranged in a second direction perpendicular to the first direction and a plurality of column virtual lines extending in the second direction on the surface of the element body and arranged in the first direction. The plurality of row virtual lines include first to third row virtual lines arranged in this order in the second direction. The plurality of column virtual lines include first to third column virtual lines arranged in this order in the first direction. The plurality of solder balls include a first signal ball disposed at the intersection between the second row virtual line and the second column virtual line and coupled to the first antenna element and a plurality of ground balls for supplying a ground potential. The plurality of ground balls include first to fourth ground balls disposed, out of a plurality of intersections between the first to third row virtual lines and the first to third column virtual lines, at any of the intersections other than those at which the first signal ball is disposed. No solder ball is disposed, out of the intersections between the plurality of row and column virtual lines, at least at some of the plurality of intersections other than those at which the first signal ball or first to fourth ground balls are disposed.

BRIEF DESCRIPTION OF THE DRAWINGS

The above features and advantages of the present disclosure will be more apparent from the following description of certain preferred embodiments taken in conjunction with the accompanying drawings, in which:

FIG. 1A is a top view, and FIG. 1B is a view from the mounting surface side;

DETAILED DESCRIPTION OF THE EMBODIMENTS

An object of the present disclosure is to provide an antenna module reduced in material cost.

Preferred embodiments of the present disclosure will be explained below in detail with reference to the accompanying drawings.

Figure 1A:
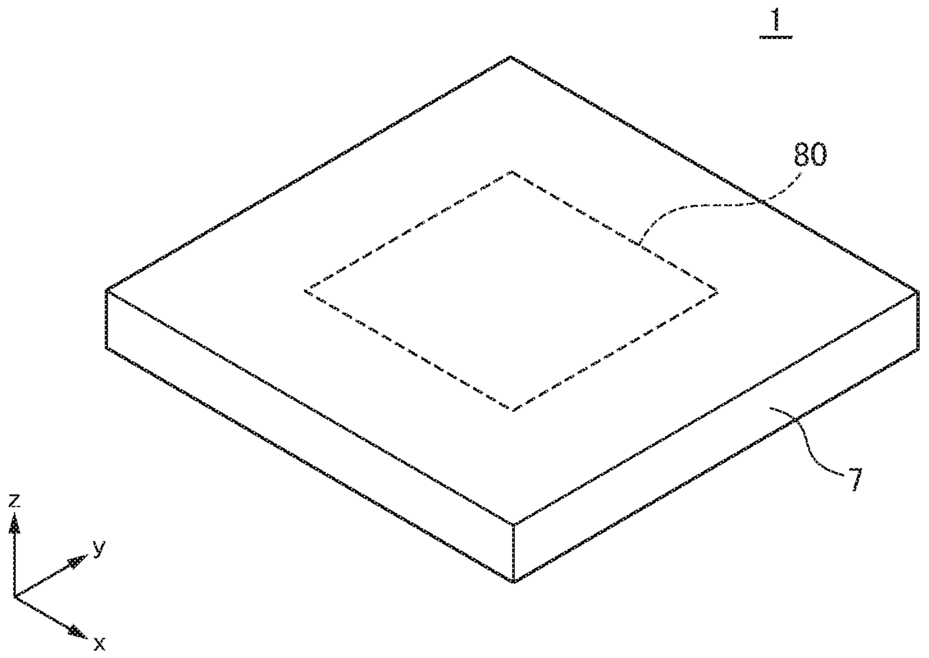
FIGS. 1A and 1B are schematic perspective views illustrating the outer appearance of an antenna module 1 according to a first embodiment of the present disclosure, where
Figure 1B:
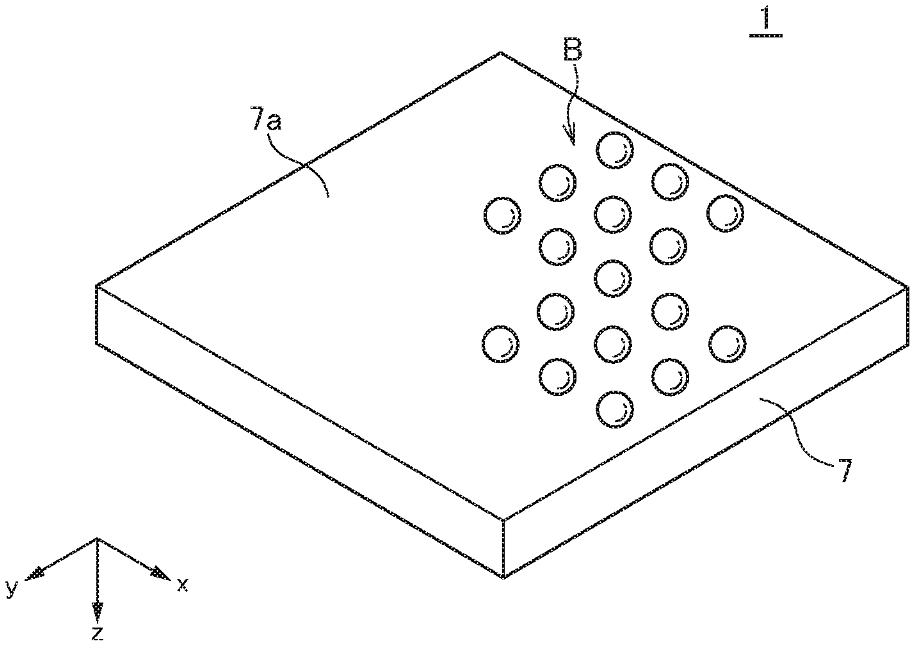

FIGS. 1A and 1B are schematic perspective views illustrating the outer appearance of an antenna module 1 according to a first embodiment of the present disclosure. FIG. 1A is a top view, and FIG. 1B is a view from the mounting surface side.

As illustrated in FIGS. 1A and 1B, the antenna module 1 according to the first embodiment includes a flat plate-shaped element body 7 in which the xy-direction and the z-direction are defined as the planar direction and the thickness direction, respectively, a plurality of conductor patterns, including a first antenna element 80, embedded in the element body 7, and a plurality of solder balls B provided on a mounting surface 7*a* which is one surface of the element body 7. The element body 7 has a multilayer structure and can be made of a ceramic material such as LTCC (Low Temperature Co-Fired Ceramics) or a resin material.

FIGS. 2 to 9 are schematic plan views each illustrating the pattern shape of a conductor pattern included in the antenna module 1.

Figure 2:
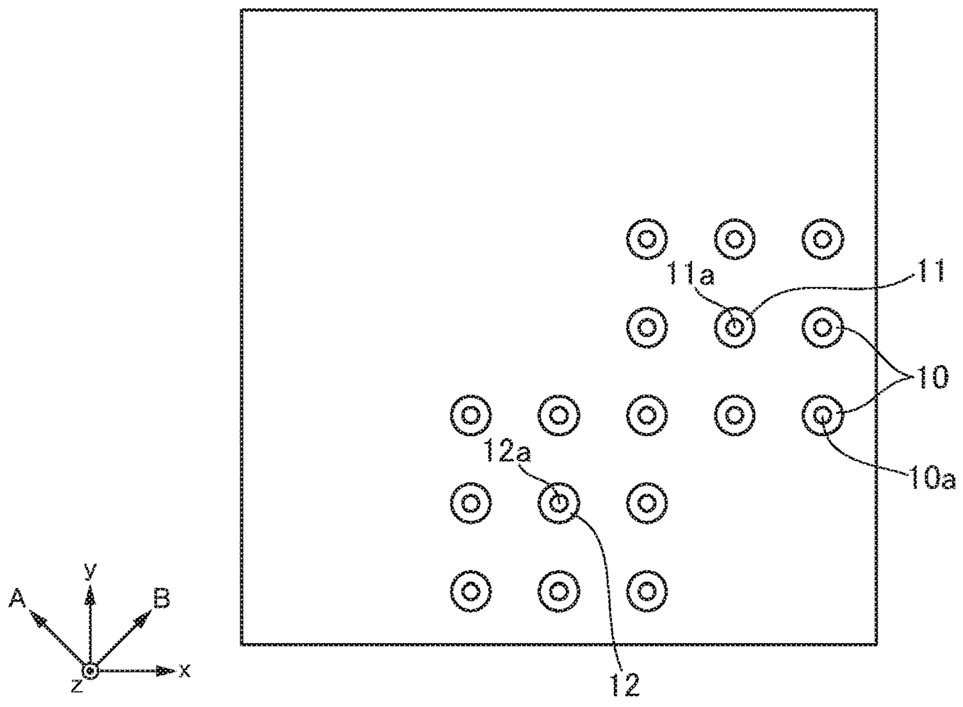
FIGS. 2 to 9 are schematic plan views each illustrating the pattern shape of a conductor pattern included in the antenna module 1.

The conductor pattern illustrated in FIG. 2 is a conductor pattern of a lowermost conductor layer. The lowermost conductor layer has a plurality of ground pads 10, a first signal pad 11, and a second signal pad 12. The first signal pad 11 is a terminal for transmitting/receiving, for example, a vertically polarized signal, and the second signal pad 12 is a terminal for transmitting/receiving, for example, a horizontally polarized signal. The plurality of ground pads 10, first signal pad 11, and second signal pad 12 may each have a solder ball B illustrated in FIG. 1B mounted thereon. Although not particularly limited, the first and second signal pads 11 and 12 are symmetrically positioned with respect to the diagonal line extending in the direction A in the present embodiment. Each of the ground pads 10, first signal pad 11, and second signal pad 12 are connected respectively with through hole conductors 10*a*, 11*a*, and 12*a* extending in the z-direction.

Figure 3:
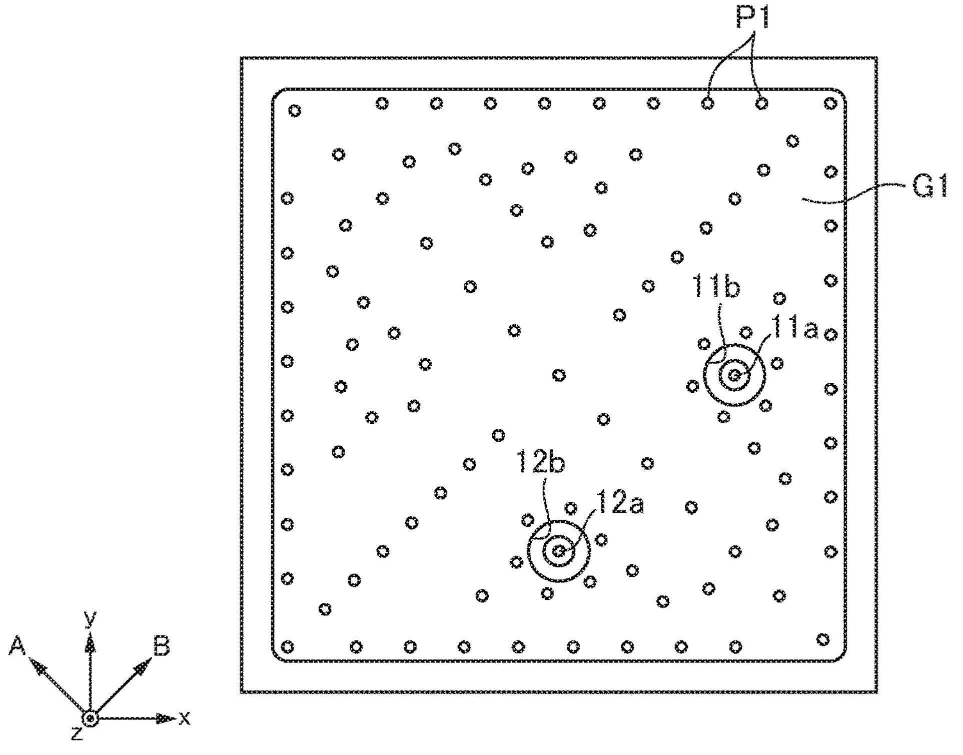

The conductor pattern illustrated in FIG. 3 is a conductor pattern positioned in the upper layer of the conductor pattern illustrated in FIG. 2 and has a ground pattern G1 formed on substantially the entire surface of the xy plane. The ground pattern G1 is connected to the plurality of ground pads 10 through the through hole conductors 10*a* illustrated in FIG. 2. As illustrated in FIG. 3, the ground pattern G1 has openings 11*b* and 12*b*, and the through hole conductors 11*a* and 12*a* pass through the openings 11*b* and 12*b*, respectively, to be connected to a conductor pattern in the upper layer. The ground pattern G1 is further connected to a ground pattern in the upper layer through a plurality of through hole conductors P1.

Figure 4:
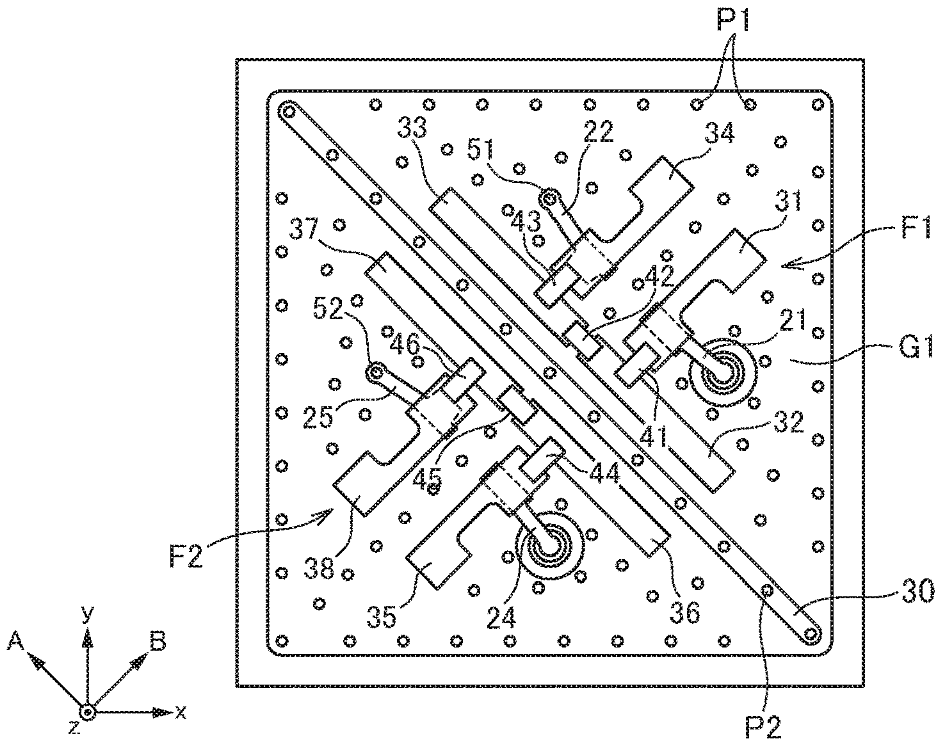

The conductor pattern illustrated in FIG. 4 is a conductor pattern positioned in the upper layer of the conductor pattern illustrated in FIG. 3 and has a ground pattern 30 disposed on the diagonal line extending in the direction A, a first ½ wavelength filer F1, and a second ½ wavelength filer F2. The ground pattern 30 is connected to the ground pattern G1 through the through hole conductors P1 illustrated in FIG. 3. The ground pattern 30 is further connected to a ground pattern in the upper layer through a plurality of through hole conductors P2. The first and second ½ wavelength filers F1 and F2 are each a band-pass filter having a so-called 7*c* type structure.

The first ½ wavelength filer F1 includes first to fourth resonance patterns 31 to 34. As illustrated in FIG. 4, the second and third resonance patterns 32 and 33 are arranged in a line so as to extend in the direction along the ground pattern 30, i.e., the diagonal line. Further, the first and fourth resonance patterns 31 and 34 extend in the direction B, respectively with respect to the second and third resonance patterns 32 and 33. The direction B is the extending direction of another diagonal line and is perpendicular to the direction A.

The first resonance pattern 31 overlaps a part of a first wiring 21. The first wiring 21 is connected to the first signal pad 11 through the through hole conductor 11*a*. Accordingly, the first resonance pattern 31 is connected to the first signal pad 11 through capacitive coupling to the first wiring 21. The first and second resonance patterns 31 and 32 are capacitively coupled to each other through a coupling pattern 41. The second and third resonance patterns 32 and 33 are capacitively coupled to each other through a coupling pattern 42. The third and fourth resonance patterns 33 and 34 are capacitively coupled to each other through a coupling pattern 43. The fourth resonance pattern 34 overlaps a part of a second wiring 22. The second wiring 22 is connected to a conductor pattern in the upper layer through a first through hole conductor 51. The coupling patterns 41 to 43 are each a conductor pattern.

The first wiring 21 is a conductor pattern extending substantially in the direction A. The first wiring 21 is connected at its one end to the through hole conductor 11*a* and overlaps at its other end the first resonance pattern 31. Thus, the through hole conductor 11*a* is provided at a planar position different from the first resonance pattern 31. That is, the opening 11*b* through which the through hole conductor 11*a* penetrates is provided at a position not overlapping the first resonance pattern 31 in a plan view.

The second wiring 22 is a conductor pattern extending substantially in the direction A. The second wiring 22 overlaps at its one end the fourth resonance pattern 34 and is connected at its other end to the first through hole conductor 51. Thus, the first through hole conductor 51 is provided at a planar position different from the fourth resonance pattern 34.

The first to fourth resonance patterns 31 to 34 each constitute a resonator. The first to fourth resonance patterns 31 to 34 are each a both-end open type resonator whose both ends are opened. The length of each of the second and third resonance patterns 32 and 33 is set to about ½ of the passband frequency of the first ½ wavelength filer F1. In each of the first and fourth resonance patterns 31 and 34, the pattern width thereof in the direction A is smaller at the center portion between both end portions thereof in the direction B than at the both end portions. In the present embodiment, the center portion of the first resonance pattern 31 is offset to the fourth resonance pattern 34 side in the direction A with respect to the both end portions, and the edges of the first resonance pattern 31 on the side close to the fourth resonance pattern 34 in the direction A at the both end portions and the center portion are flush with each other. Similarly, the center portion of the fourth resonance pattern 34 is offset to the first resonance pattern 31 side in the direction A with respect to the both end portions, and the edges of the fourth resonance pattern 34 on the side close to the first resonance pattern 31 in the direction A at the both end portions and the center portion are flush with each other.

The second ½ wavelength filter F2 has a symmetric structure to the first ½ wavelength filer F1 with respect to the ground pattern 30. The second ½ wavelength filter F2 includes fifth to eighth resonance patterns 35 to 38 that are conductor patterns. As illustrated in FIG. 4, the sixth and seventh resonance patterns 36 and 37 are arranged in a line so as to extend in the direction A along the ground pattern 30, i.e., the diagonal line. The sixth resonance pattern 36 is disposed so as to face the second resonance pattern 32 in the direction B, and the seventh resonance pattern 37 is disposed so as to face the third resonance pattern 33 in the direction B. The fifth and eighth resonance patterns 35 and 38 extend in the direction B, respectively with respect to the sixth and seventh resonance patterns 36 and 37.

The fifth resonance pattern 35 overlaps a part of a fourth wiring 24. The fourth wiring 24 is connected to the second signal pad 12 through the through hole conductor 12*a*. Accordingly, the fifth resonance pattern 35 is connected to the second signal pad 12 through capacitive coupling to the fourth wiring 24. The fifth and sixth resonance patterns 35 and 36 are capacitively coupled to each other through a coupling pattern 44. The sixth and seventh resonance patterns 36 and 37 are capacitively coupled to each other through a coupling pattern 45. The seventh and eighth resonance patterns 37 and 38 are capacitively coupled to each other through a coupling pattern 46. The eighth resonance pattern 38 overlaps a part of a fifth wiring 25. The fifth wiring 25 is connected to a conductor pattern in the upper layer through a second through hole conductor 52. The coupling patterns 44 to 46 are each a conductor pattern.

The fourth wiring 24 is a conductor pattern extending substantially in the direction A. The fourth wiring 24 is connected at its one end to the through hole conductor 12*a* and overlaps at its the other end the fifth resonance pattern 35. Thus, the through hole conductor 12*a* is provided at a planar position different from the fifth resonance pattern 35. That is, the opening 12*b* through which the through hole conductor 12*a* penetrates is provided at a position not overlapping the fifth resonance pattern 35 in a plan view.

The fifth wiring 25 is a conductor pattern extending substantially in the direction A. The fifth wiring 25 overlaps at its one end the eighth resonance pattern 38 and is connected at its other end to the second through hole conductor 52. Thus, the second through hole conductor 52 is provided at a planar position different from the eighth resonance pattern 38.

The fifth to eighth resonance patterns 35 to 38 each constitute a resonator. The fifth to eighth resonance patterns 35 to 38 are each a both-end open type resonator whose both ends are opened. The length of each of the sixth and seventh resonance patterns 36 and 37 is set to about ½ of the passband frequency of the second ½ wavelength filer F2. In each of the fifth and eighth resonance patterns 35 and 38, the pattern width thereof in the direction A is smaller at the center portion between both end portions thereof in the direction B than at the both end portions. In the present embodiment, the center portion of the fifth resonance pattern 35 is offset to the eighth resonance pattern 38 side in the direction A with respect to the both end portions, and the edges of the fifth resonance pattern 35 on the side close to the eighth resonance pattern 38 in the direction A at the both end portions and the center portion are flush with each other.

Similarly, the center portion of the eighth resonance pattern 38 is offset to the fifth resonance pattern 35 side in the direction A with respect to the both end portions, and the edges of the eighth resonance pattern 38 on the side close to the fifth resonance pattern 35 in the direction A at the both end portions and the center portion are flush with each other.

The overlap area between the fourth resonance pattern 34 and the second wiring 22 and the overlap area between the eighth resonance pattern 38 and the fifth wiring 25 are larger than the overlap area between the first resonance pattern 31 and the first wiring 21 and the overlap area between the fifth resonance pattern 35 and the fourth wiring 24. This facilitates impedance matching to make it possible to widen a band in which a satisfactory return loss can be obtained.

Figure 5:
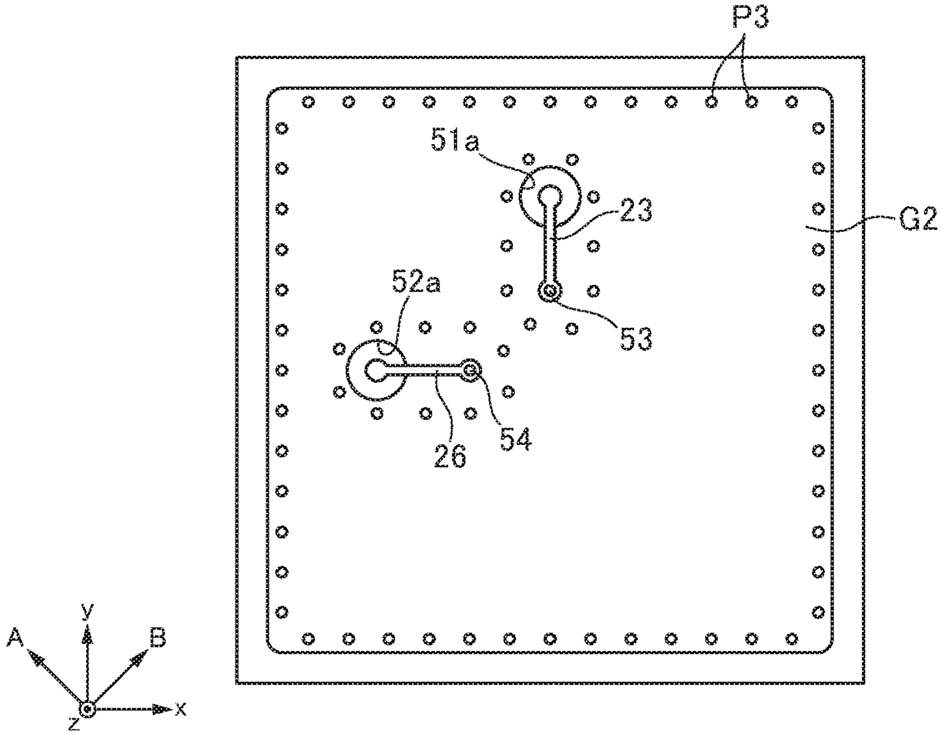

The conductor pattern illustrated in FIG. 5 is a conductor pattern positioned in the upper layer of the conductor pattern illustrated in FIG. 4 and has a ground pattern G2 formed on substantially the entire surface of the xy plane. The ground pattern G2 is connected to the ground patterns G1 and 30 respectively through the through hole conductors P1 and P2 illustrated in FIGS. 3 and 4. As illustrated in FIG. 5, the ground pattern G2 has first and second openings 51*a* and 52*a*, and the first and second through hole conductors 51 and 52 pass through the first and second openings 51*a* and 52*a*, respectively, to be connected respectively to one ends of the third and sixth wirings 23 and 26 positioned in the upper layer of the ground pattern G2. Since the first through hole conductor 51 is connected to the other end of the second wiring 22, the first opening 51*a* through which the first through hole conductor 51 penetrates is provided at a position not overlapping the fourth resonance pattern 34 in a plan view. Further, since the second through hole conductor 52 is connected to the other end of the fifth wiring 25, the second opening 52*a* through which the second through hole conductor 52 penetrates is provided at a position not overlapping the eighth resonance pattern 38 in a plan view. The pattern width of each of the third and sixth wirings 23 and 26 is designed to be smaller than the pattern width of each of the second and fifth wirings 22 and 25. This facilitates impedance matching to make it possible to widen a band in which a satisfactory return loss can be obtained. The ground pattern G2 is further connected to a ground pattern in the upper layer through a plurality of through hole conductors P3.

The third wiring 23 is a conductor pattern extending in the y-direction. The third wiring 23 is connected at its one end to the first through hole conductor 51 and connected at its other end to the through hole conductor 53. Thus, the first through hole conductor 51 and the through hole conductor 53 are provided at mutually different positions.

The sixth wiring 26 is a conductor pattern extending in the x-direction. The sixth wiring 26 is connected at its one end to the second through hole conductor 52 and connected at its other end to the through hole conductor 54. Thus, the second through hole conductor 52 and the through hole conductor 54 are provided at mutually different positions.

Figure 6:
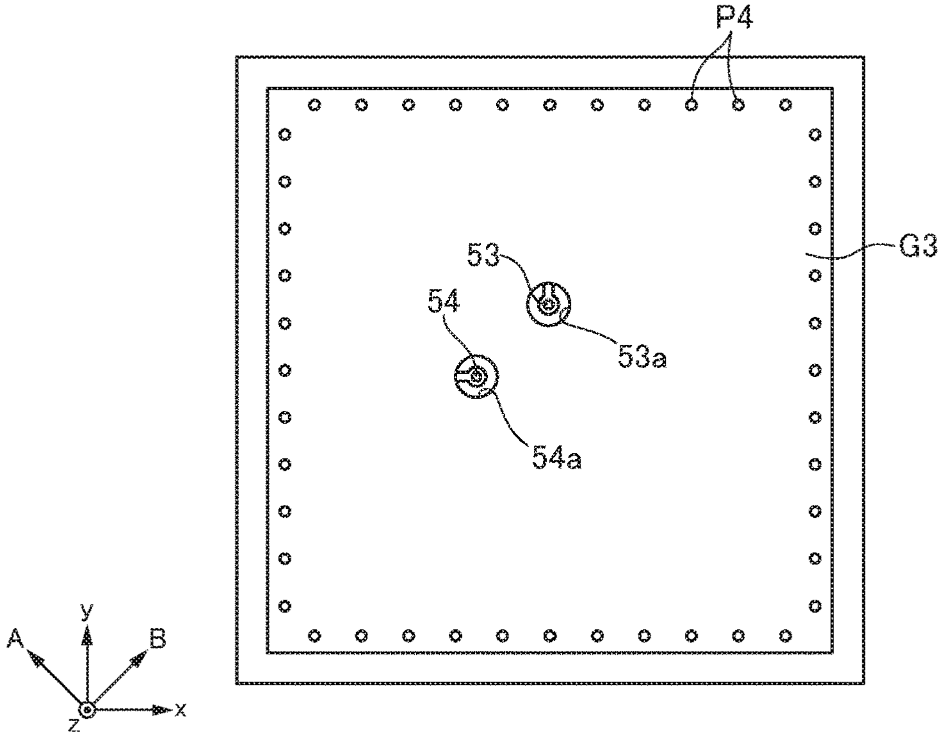

The conductor pattern illustrated in FIG. 6 is a conductor pattern positioned in the upper layer of the conductor pattern illustrated in FIG. 5 and has a ground pattern G3 formed on substantially the entire surface of the xy plane. The ground pattern G3 is connected to the ground patterns G2 through the through hole conductor P3 illustrated in FIG. 5. As illustrated in FIG. 6, the ground pattern G3 has openings 53*a* and 54*a* through which the through hole conductors 53 and 54 connected respectively to the other ends of the third and sixth wirings 23 and 26 pass respectively. Since the through hole conductor 53 is connected to the other end of the third wiring 23, the opening 53*a* through which the through hole conductor 53 penetrates is provided at a position not overlapping the first opening 51*a* in a plan view. Further, since the through hole conductor 54 is connected to the other end of the sixth wiring 26, the opening 54*a* through which the through hole conductor 54 penetrates is provided at a position not overlapping the second opening 52*a* in a plan view. The ground pattern G3 is further connected to a ground pattern in the upper layer through a plurality of through hole conductors P4.

Figure 7:
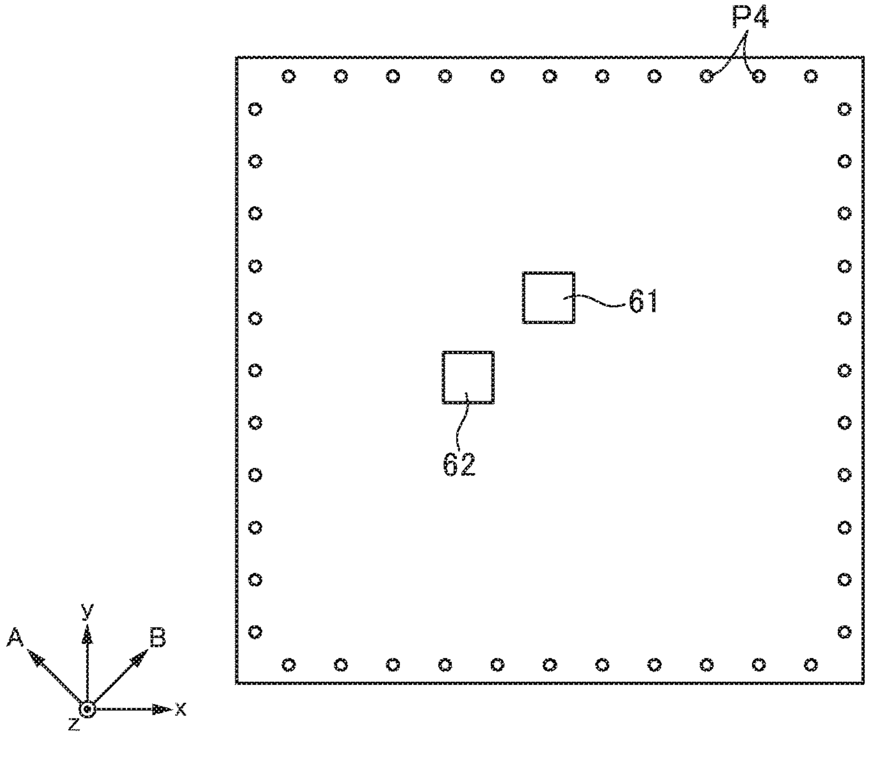

The conductor pattern illustrated in FIG. 7 is a conductor pattern positioned in the upper layer of the conductor pattern illustrated in FIG. 6 and has first and second capacitive coupling electrodes 61 and 62. The first and second capacitive coupling electrodes 61 and 62 are connected respectively to the through hole conductors 53 and 54.

Figure 8:
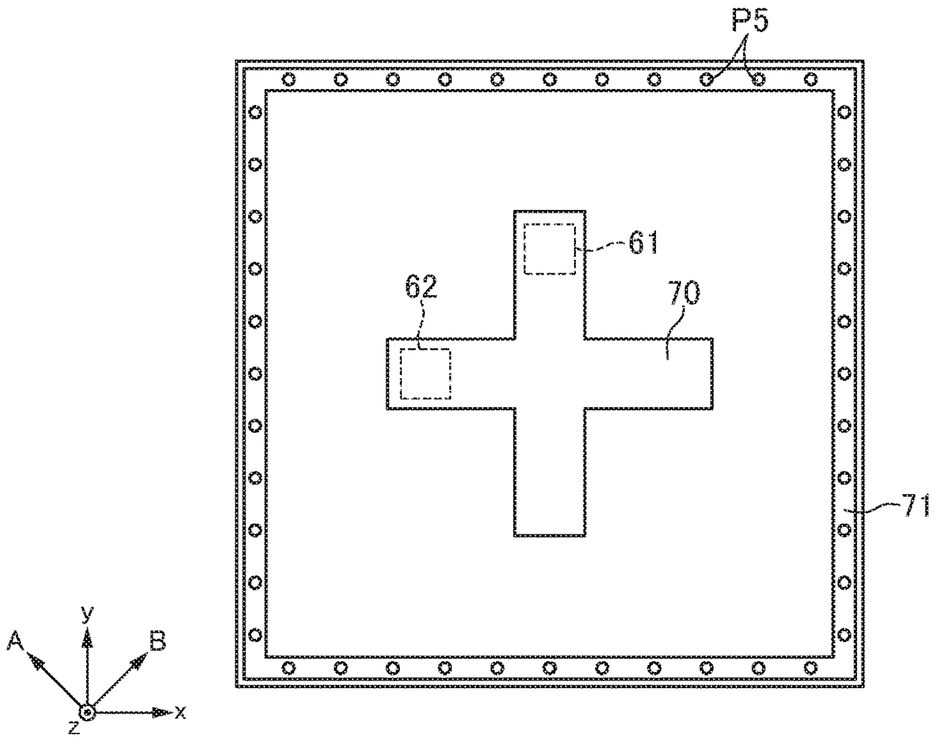

The conductor pattern illustrated in FIG. 8 is a conductor pattern positioned in the upper layer of the conductor pattern illustrated in FIG. 7 and has a feed electrode 70 and a ground pattern 71. The feed electrode 70 has a cross shape, in which one end portion in the y-direction overlaps the first capacitive coupling electrode 61, and one end portion in the x-direction overlaps the second capacitive coupling electrode 62. As a result, the feed electrode 70 is capacitively coupled to the first and second capacitive coupling electrodes 61 and 62. The ground pattern 71 has a rectangular annular shape disposed along the outer periphery and is connected to the ground pattern G3 through the through hole conductors P4 illustrated in FIGS. 6 and 7. The ground pattern 71 is further connected to a ground pattern in the upper layer through a plurality of through hole conductors P5.

Figure 9:
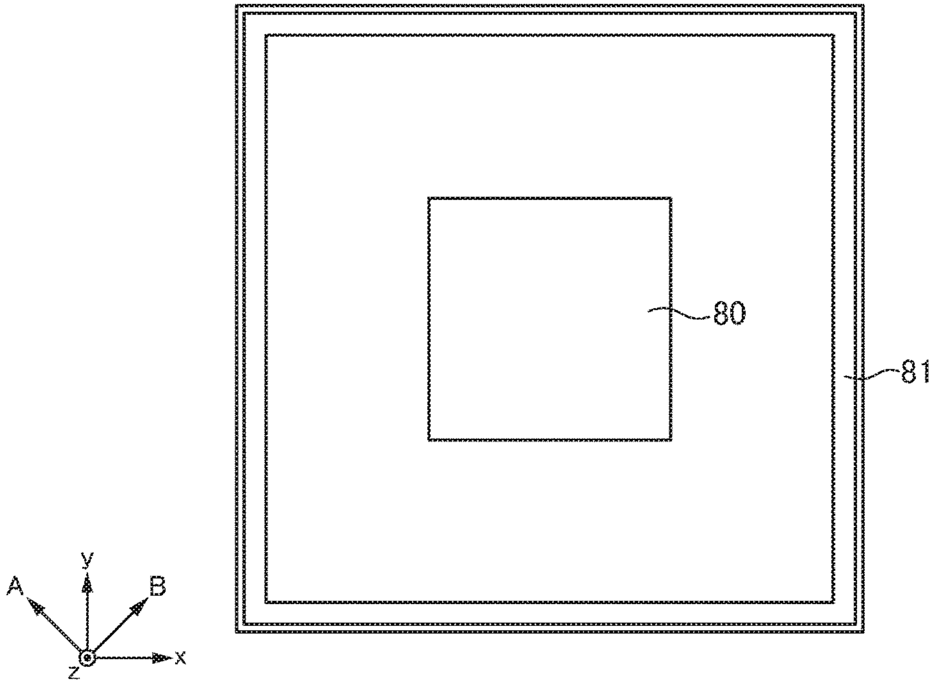

The conductor pattern illustrated in FIG. 9 is a conductor pattern positioned in the upper layer of the conductor pattern illustrated in FIG. 8 and has a first antenna element 80 and a ground pattern 81. The first antenna element 80 is a patch conductor having a substantially rectangular shape and overlaps the feed electrode 70. As a result, the antenna element 80 and feed electrode 70 are capacitively coupled. The ground pattern 81 has a rectangular annular shape disposed along the outer periphery and is connected to the ground pattern 71 through the through hole conductors P5 illustrated in FIG. 8.

With the above configuration, the first ½ wavelength filer F1 is inserted between the first signal pad 11 and the first antenna element 80, and the second ½ wavelength filer F2 is inserted between the second signal pad 12 and the first antenna element 80. Thus, a vertically polarized signal supplied to the first signal pad 11 and a horizontally polarized signal supplied to the second signal pad 12 are fed to the first antenna element 80, respectively through the first and second ½ wavelength filters F1 and F2, thereby achieving dual polarization.

Figure 10:
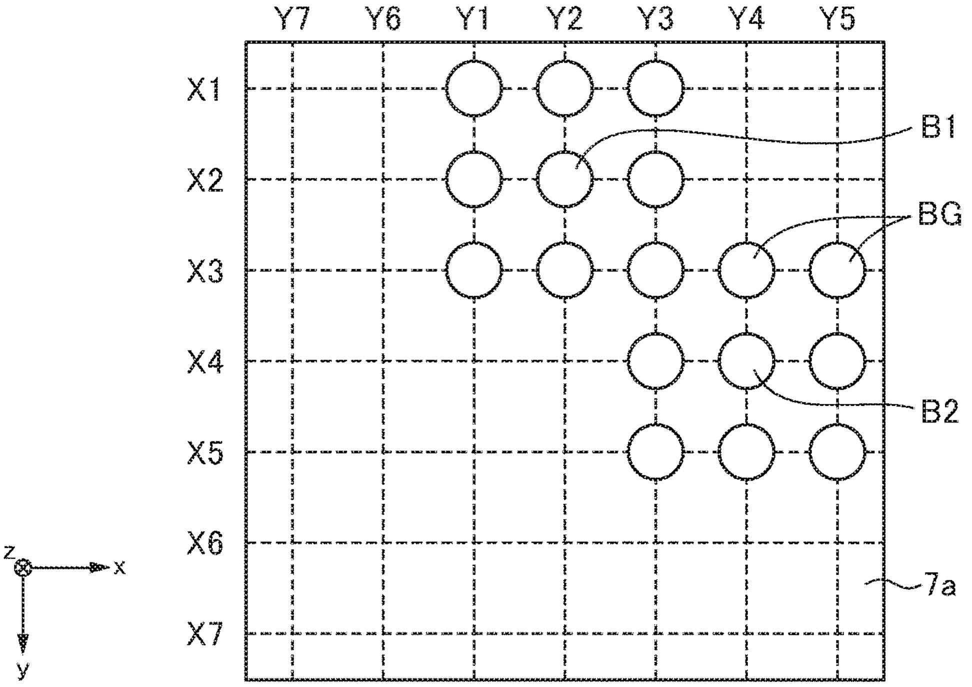
FIG. 10 is a schematic plan view for explaining the layout of the solder balls B on the mounting surface 7*a;*

FIG. 10 is a schematic plan view for explaining the layout of the solder balls B on the mounting surface 7*a*.

As illustrated in FIG. 10, assume that first to seventh row virtual lines X1 to X7 extending in the x-direction (first direction) and arranged at equal intervals in the y-direction (second direction) and first to seventh column virtual lines Y1 to Y7 extending in the y-direction and arranged at equal intervals in the x-direction. On the mounting surface 7*a*, the solder balls B are disposed at some intersections between the first to fifth row virtual lines X1 to X5 and the first to seventh column virtual lines Y1 to Y5. The first to seventh row virtual lines X1 to X7 are arranged at equal intervals from one end portion of the mounting surface 7*a* in the y-direction to the other end portion in the y-direction. The first to seventh column virtual lines Y1 to Y7 are arranged at equal intervals from one end portion of the mounting surface 7*a* in the x-direction to the other end portion in the x-direction. In the example illustrated in FIG. 10, no solder ball B is disposed on the sixth row virtual line X6, seventh row virtual line X7, sixth column virtual line Y6, and seventh column virtual line Y7. Of the plurality of solder balls B, a first signal ball B1 to be connected to the first signal pad 11 is disposed at the intersection between the second row virtual line X2 and the second column virtual line Y2, and a second signal ball B2 to be connected to the second signal pad 12 is disposed at the intersection between the fourth row virtual line X4 and the fourth column virtual line Y4. The first and second signal balls B1 and B2 are disposed at 90-degree rotationally symmetric positions with the center of the first antenna element 80 as the rotation axis. The other solder balls B are ground balls BG for supplying a ground potential.

In the first embodiment, the ground balls BG are disposed at the intersections between the first row virtual line X1 and the first to third column virtual lines Y1 to Y3, the intersections between the second row virtual line X2 and the first and third column virtual lines Y1 and Y3, the intersections between the third row virtual line X3 and the first to fifth column virtual lines Y1 to Y5, the intersections between the fourth row virtual line X4 and the third and fifth column virtual lines Y3 and Y5, and the intersections between the fifth row virtual line X5 and the third to fifth column virtual lines Y3 to Y5. No solder ball B is disposed at the other intersections. Specifically, no solder ball B is disposed at the intersections between the first and second row virtual lines X1 and X2 and the fourth to seventh column virtual lines Y4 to Y7, the intersections between the third row virtual line X3 and the sixth and seventh column virtual lines Y6 and Y7, the intersections between the fourth and fifth row virtual lines X4 and X5 and the first, second, sixth, and seventh column virtual lines Y1, Y2, Y6, and Y7, and the intersections between the sixth and seventh row virtual lines X6 and X7 and the first to seventh column virtual lines Y1 to Y7. The ground pad 10 may be omitted at the intersections where no solder ball B is disposed.

Figure 11:
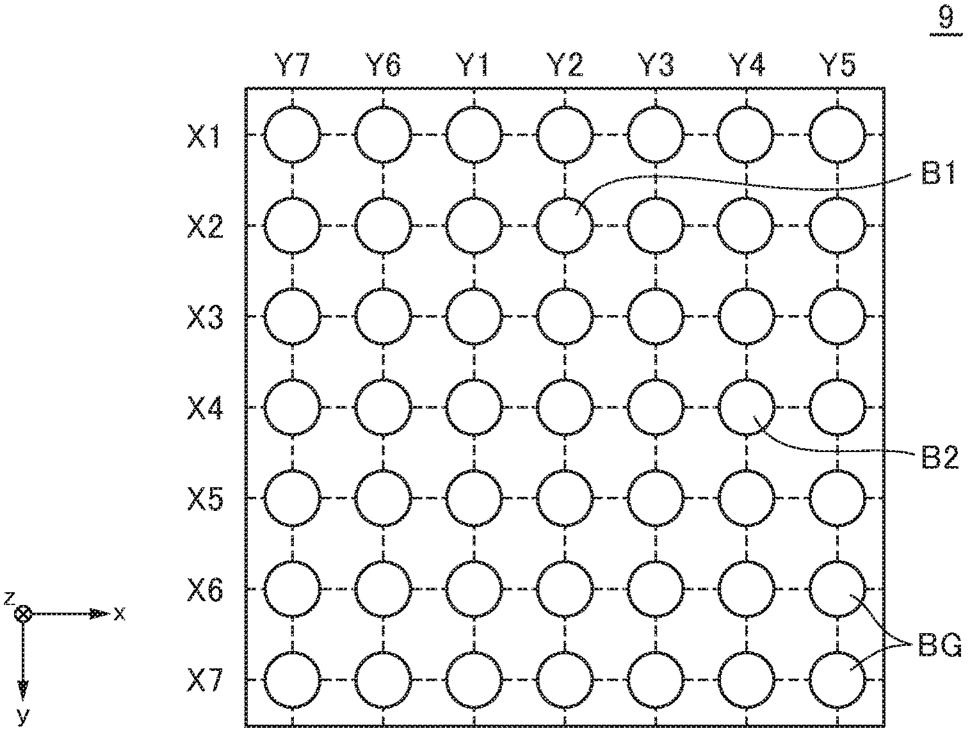
FIG. 11 is a schematic plan view for explaining the layout of the solder balls B in an antenna module 9 according to a first comparative example.

As described above, in the first embodiment, the ground balls BG are disposed only the positions surrounding the first and second signal balls B1 and B2, so that as compared to an antenna module 9 according to a first comparative example illustrated in FIG. 11 where the ground balls BG are disposed at all the other positions (intersections) than those at which the first and second signal balls B1 and B2 are disposed, material cost can be reduced. Further, in the first embodiment, no solder ball B is disposed at the intersections corresponding to the four corners of the mounting surface 7*a*. Specifically, no solder ball B is disposed at the intersection between the first row virtual line X1 and the seventh column virtual line Y7, the intersection between the first row virtual line X1 and the fifth column virtual line Y5, the intersection between the seventh row virtual line X7 and the seventh column virtual line Y7, and the intersection between the seventh row virtual line X7 and the fifth column virtual line Y5. The four corners of the antenna module is subjected most to thermal stress, so that by omitting the solder ball B at the intersections corresponding to the four corners of the mounting surface 7*a* in the antenna module 1 according to the first embodiment, thermal stress applied to the antenna module 1 can be reduced.

Figure 12A:
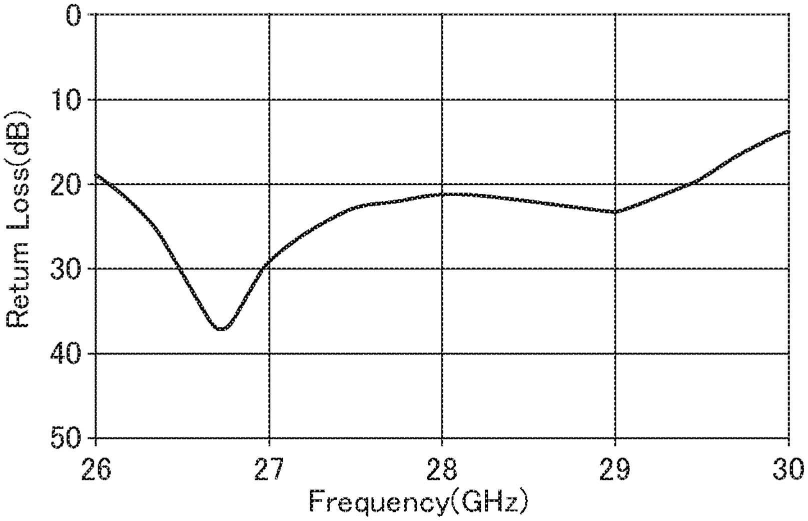
FIGS. 12A to 12C are graphs each illustrating the characteristics of the antenna module 1 according to the first embodiment.
Figure 12B:
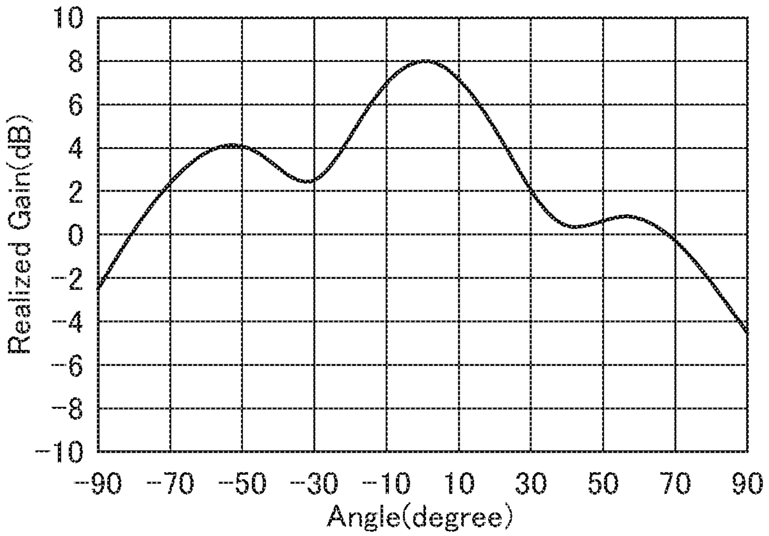
Figure 12C:
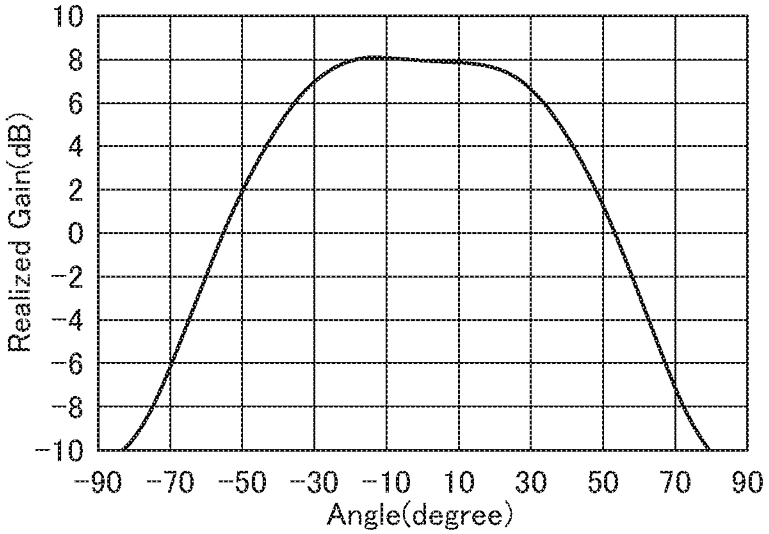
Figure 13A:
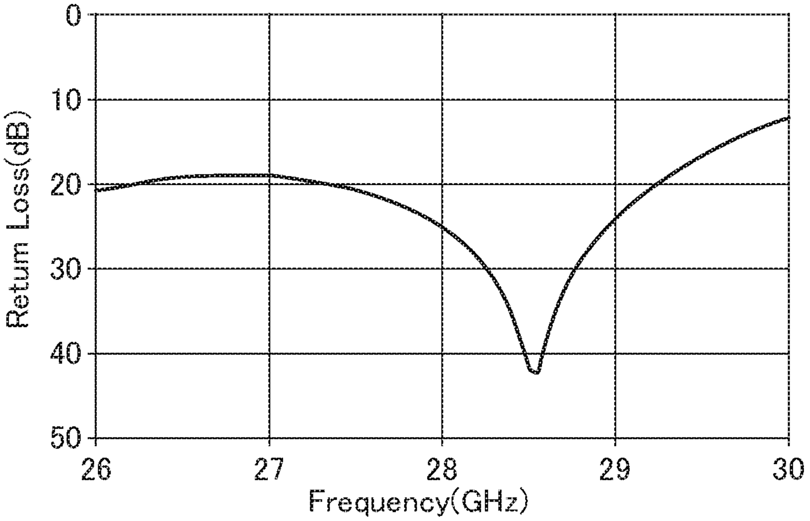
FIGS. 13A to 13C are graphs each illustrating the characteristics of the antenna module 9 according to the first comparative example.
Figure 13B:
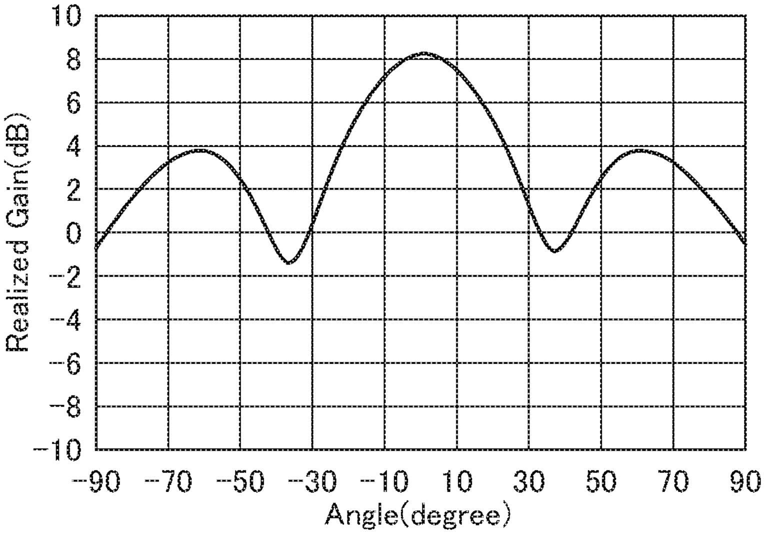
Figure 13C:
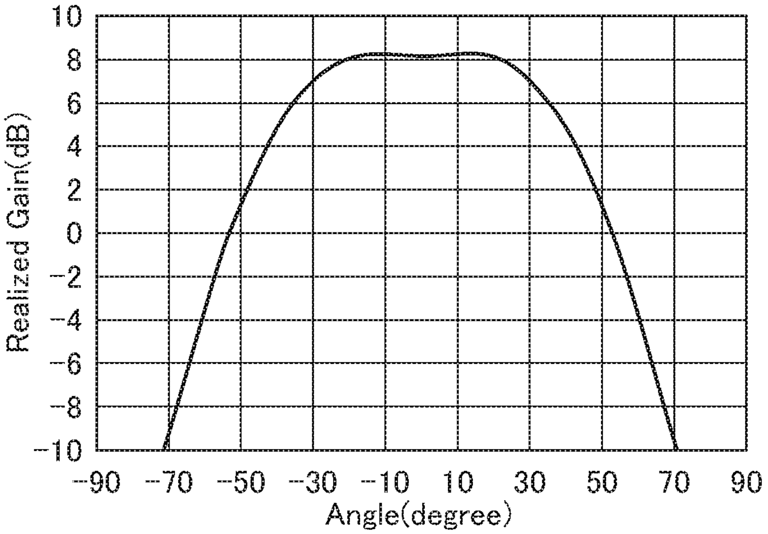

FIGS. 12A to 12C are graphs each illustrating the characteristics of the antenna module 1 according to the first embodiment. FIGS. 13A to 13C are graphs each illustrating the characteristics of the antenna module 9 according to the first comparative example illustrated in FIG. 11. FIGS. 12A and 13A illustrate a return loss, FIGS. 12B and 13B illustrate a radiation pattern on an E surface, and FIGS. 12C and 13C illustrate a radiation pattern on an H surface. The same applies to the following FIGS. 15A to 15C and FIGS. 17A to 17C.

As can be seen from FIGS. 12A to 12C and FIGS. 13A to 13C, the antenna module 1 according to the first embodiment exhibits characteristics close to those of the antenna module 9 according to the first comparative example although slight asymmetry appears in the radiation characteristics. For the peak frequency of return loss, there occurs a difference of about 2 GHz between the antenna modules 1 and 9. The reason why the antenna module 1 according to the first embodiment exhibits characteristics close to those of the antenna module 9 according to the first comparative example is that the presence of the ground ball BG at positions surrounding the first and second signal balls B1 and B2 makes a ground potential around the first and second signal balls B1 and B2 stable even though some ground balls BG are omitted. Further, the antenna module 1 according to the first embodiment has a reduced number of the ground balls as compared to the first comparative example and can thus suppress a reduction in the gain at null points between the main lobe and unnecessary side lobes of a radiation pattern on the E surface and reduce the gain of one side lobe. Thus, according to the first embodiment, it is possible to reduce material cost while achieving desired characteristics.

Figure 14:
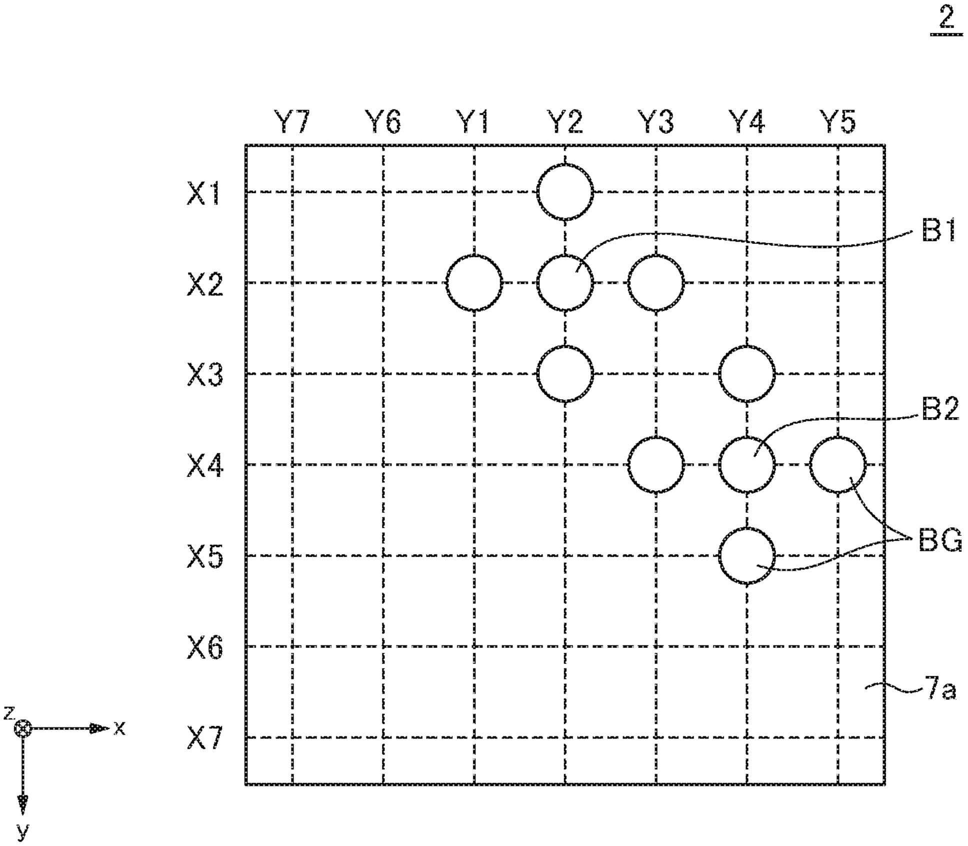
FIG. 14 is a schematic plan view for explaining the layout of the solder balls B in an antenna module 2 according to a second embodiment of the present disclosure.

FIG. 14 is a schematic plan view for explaining the layout of the solder balls B in an antenna module 2 according to a second embodiment of the present disclosure.

As illustrated in FIG. 14, the antenna module 2 according to the second embodiment differs from the antenna module 1 according to the first embodiment in that the number of ground balls BG is further reduced. Specifically, the ground balls BG are omitted at the intersections between the first row virtual line X1 and the first and third column virtual lines Y1 and Y3, the intersections between the third row virtual line X3 and the first, third, and fifth column virtual lines Y1, Y3, and Y5, the intersections between the fifth row virtual line X5 and the third and fifth column virtual lines Y3 and Y5. That is, in the second embodiment, there are provided a first ground ball at the intersection between the first row virtual line X1 and the second column virtual line Y2, a second ground ball at the intersection between the second row virtual line X2 and the first column virtual line Y1, a third ground ball at the intersection between the second row virtual line X2 and the third column virtual line Y3, a fourth ground ball at the intersection between the third row virtual line X3 and the second column virtual line Y2, a fifth ground ball at the intersection between the third row virtual line X3 and the fourth column virtual line Y4, a sixth ground ball at the intersection between the fifth row virtual line X5 and the fourth column virtual line Y4, a seventh ground ball at the intersection between the fourth row virtual line X4 and the third column virtual line Y3, and an eighth ground ball at the intersection between the fourth row virtual line X4 and the fifth column virtual line Y5.

As described above, in the second embodiment, the number of the ground balls BG disposed at positions surrounding the first and second signal balls B1 and B2 is reduced from 8 to 4, so that material cost can be further reduced as compared to the antenna module 1 according to the first embodiment.

Figure 15A:
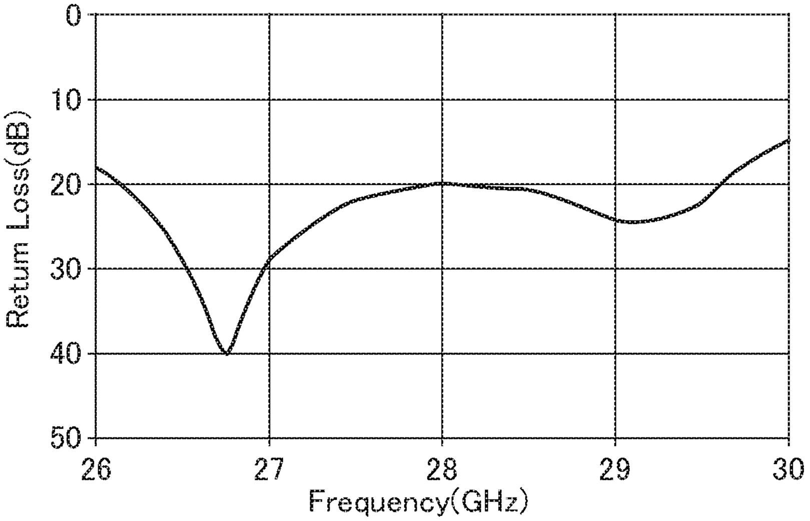
FIGS. 15A to 15C are graphs each illustrating the characteristics of the antenna module 2 according to the second embodiment.
Figure 15B:
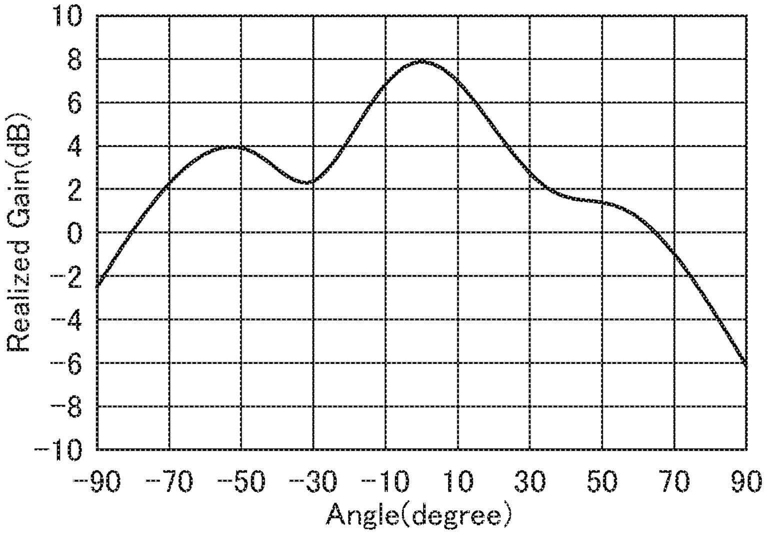
Figure 15C:
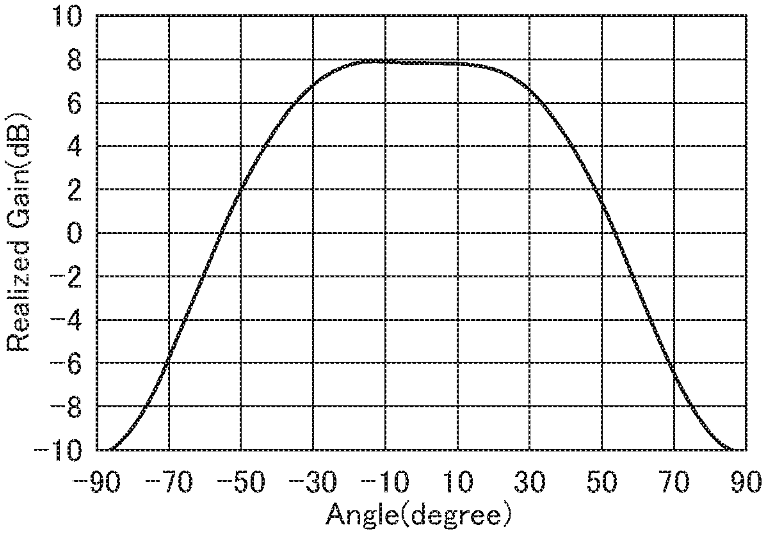

FIGS. 15A to 15C are graphs each illustrating the characteristics of the antenna module 2 according to the second embodiment.

As can be seen from FIGS. 15A to 15C, the antenna module 2 according to the second embodiment exhibits substantially the same characteristics as those of the antenna module 1 according to the first embodiment. The reason for the above is that, of the eight ground balls BG surrounding the first and second signal balls B1 and B2, the four ground balls BG distant from the first and second signal balls B1 and B2 are omitted, while the four ground balls BG close to the first and second signal balls B1 and B2 remain as they are. Further, as with the antenna module 1 according to the first embodiment, the antenna module 2 according to the second embodiment has a reduced number of the ground balls as compared to the first comparative example and can thus suppress a reduction in the gain at null points between the main lobe and unnecessary side lobes of a radiation pattern on the E surface and reduce the gain of one side lobe. Thus, according to the second embodiment, it is possible to further reduce material cost while achieving desired characteristics.

Figure 16:
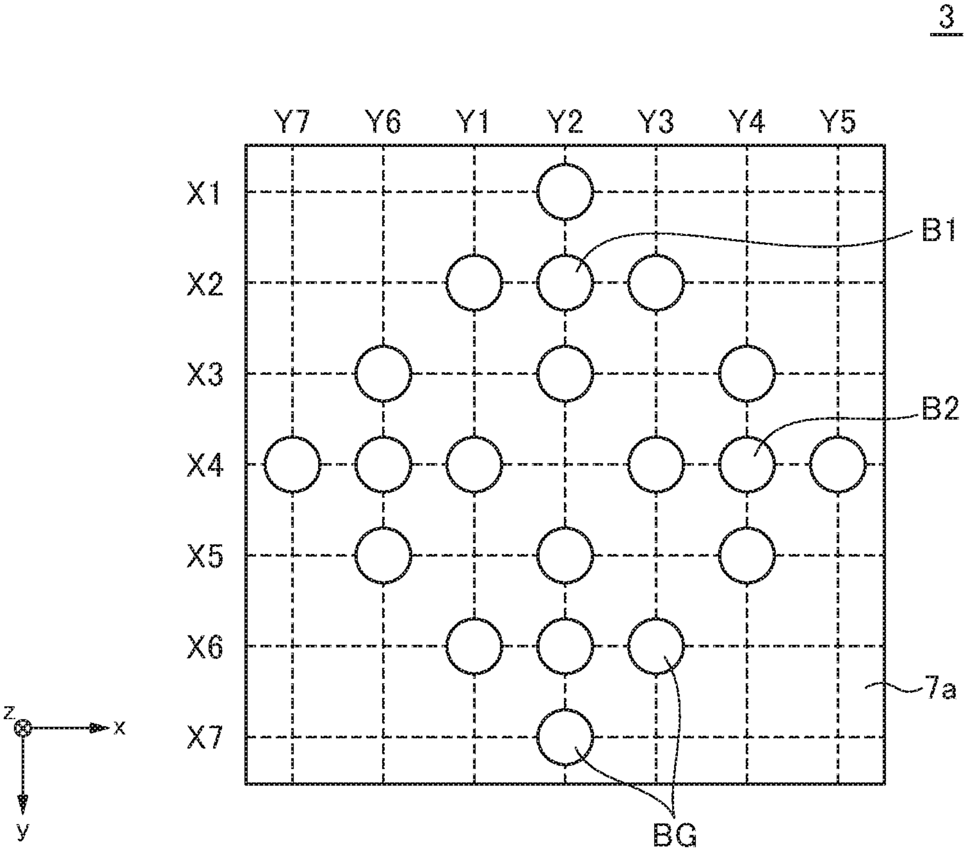
FIG. 16 is a schematic plan view for explaining the layout of the solder balls B in an antenna module 3 according to a third embodiment of the present disclosure.

FIG. 16 is a schematic plan view for explaining the layout of the solder balls B in an antenna module 3 according to a third embodiment of the present disclosure.

As illustrated in FIG. 16, in the third antenna module 3 according to the third embodiment, the ground balls BG are additionally provided at 180-degree rotationally symmetric positions to the first to eighth ground balls BG included in the antenna module 2 according to the second embodiment with the center of the first antenna element 80 as the rotation axis. That is, in the third embodiment, there are provided a ninth ground ball at the intersection between the seventh row virtual line X7 and the second column virtual line Y2, a 10th ground ball at the intersection between the sixth row virtual line X6 and the third column virtual line Y3, an 11th ground ball at the intersection between the sixth row virtual line X6 and the first column virtual line Y1, a 12th ground ball at the intersection between the fifth row virtual line X5 and the second column virtual line Y2, a 13th ground ball at the intersection between the fifth row virtual line X5 and the sixth column virtual line Y6, a 14th ground ball at the intersection between the third row virtual line X3 and the sixth column virtual line Y6, a 15th ground ball at the intersection between the fourth row virtual line X4 and the first column virtual line Y1, and a 16th ground ball at the intersection between the fourth row virtual line X4 and the seventh column virtual line Y7.

Further, in the third antenna module 3 according to the third embodiment, the ground ball BG is also additionally provided at 180-degree rotationally symmetric positions to the first and second signal balls B1 and B2 included in the antenna module 2 according to the second embodiment with the center of the first antenna element 80 as the rotation axis. That is, in the third embodiment, there are further provided a ground ball at the intersection between the sixth row virtual line X6 and the second column virtual line Y2 and a ground ball at the intersection between the fourth row virtual line X4 and the sixth column virtual line Y6.

Figure 17A:
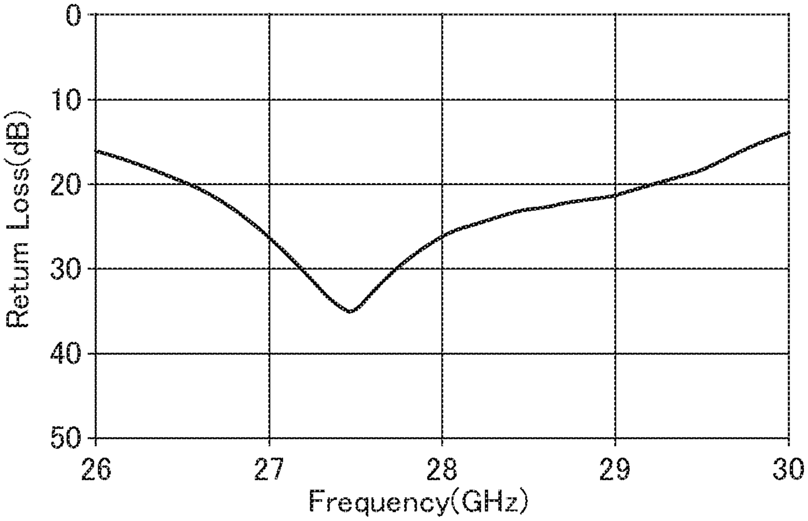
FIGS. 17A to 17C are graphs each illustrating the characteristics of the antenna module 3 according to the third embodiment.
Figure 17B:
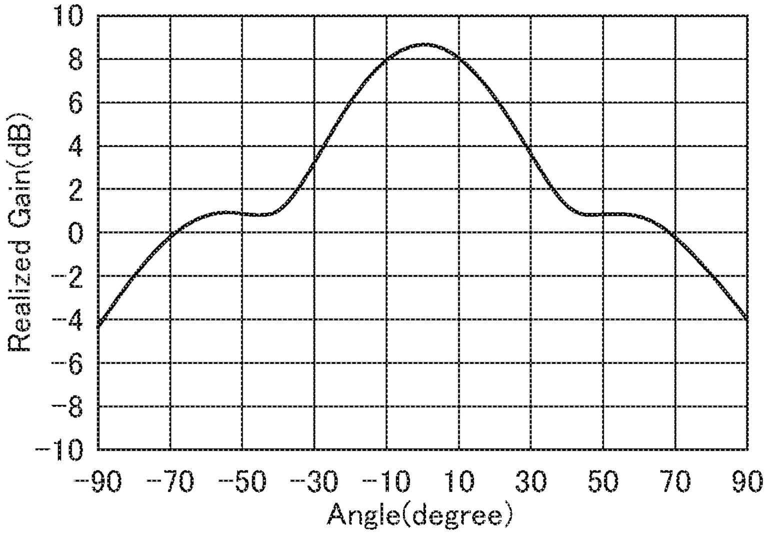
Figure 17C:
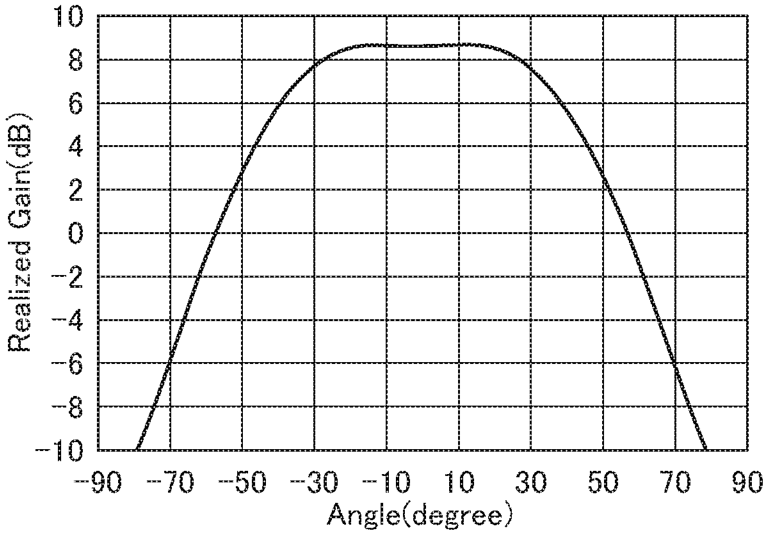

FIGS. 17A to 17C are graphs each illustrating the characteristics of the antenna module 3 according to the third embodiment.

As can be seen from FIGS. 17A to 17C, the antenna module 3 according to the third embodiment can increase the gain of the main lobe of a radiation pattern on the E surface as compared to the first comparative example. Further, as compared to the first comparative example, the antenna module 3 according to the third embodiment can suppress a reduction in the gain at null points between the main lobe and unnecessary side lobes of a radiation pattern on the E surface and reduce the gain of the side lobes on both sides of the main lobe. For the peak frequency of return loss, there occurs a difference of about 1 GHz between the antenna modules 3 and 9. Thus, according to the third embodiment, it is possible to reduce material cost while maintaining symmetry of radiation characteristics and achieving characteristics equivalent or superior to those of the antenna module 9 according to the first comparative example.

Figure 18:
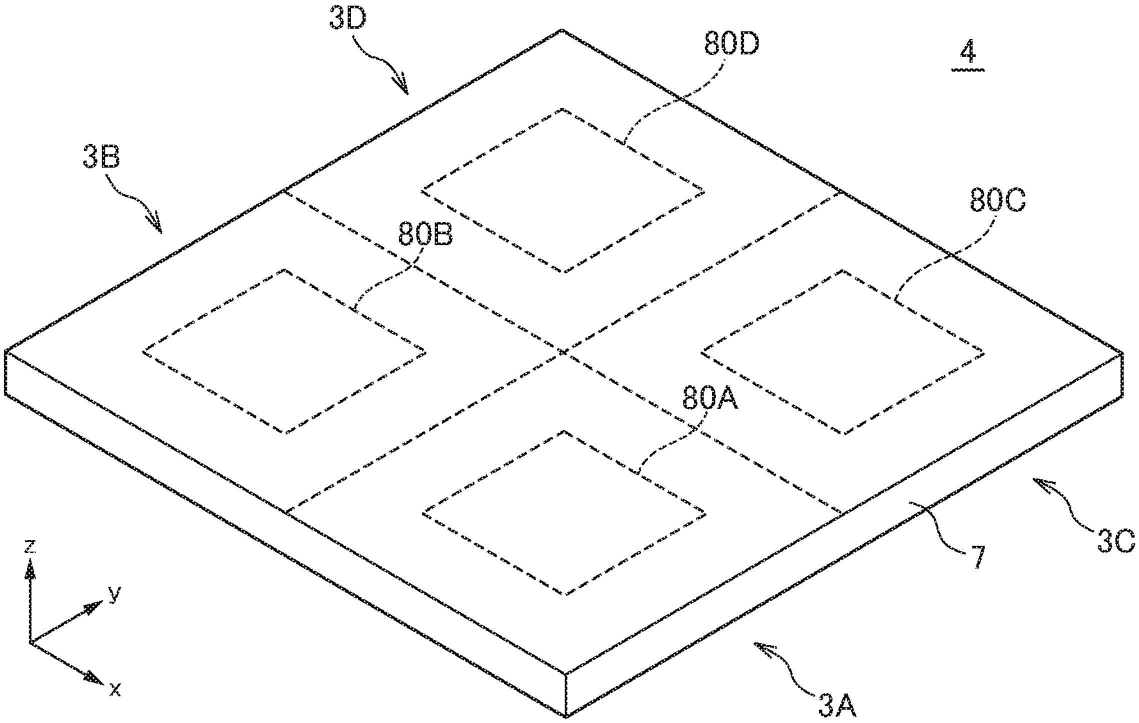
FIG. 18 is a schematic perspective view illustrating the outer appearance of an antenna module 4 according to a fourth embodiment of the present disclosure.
Figure 19:
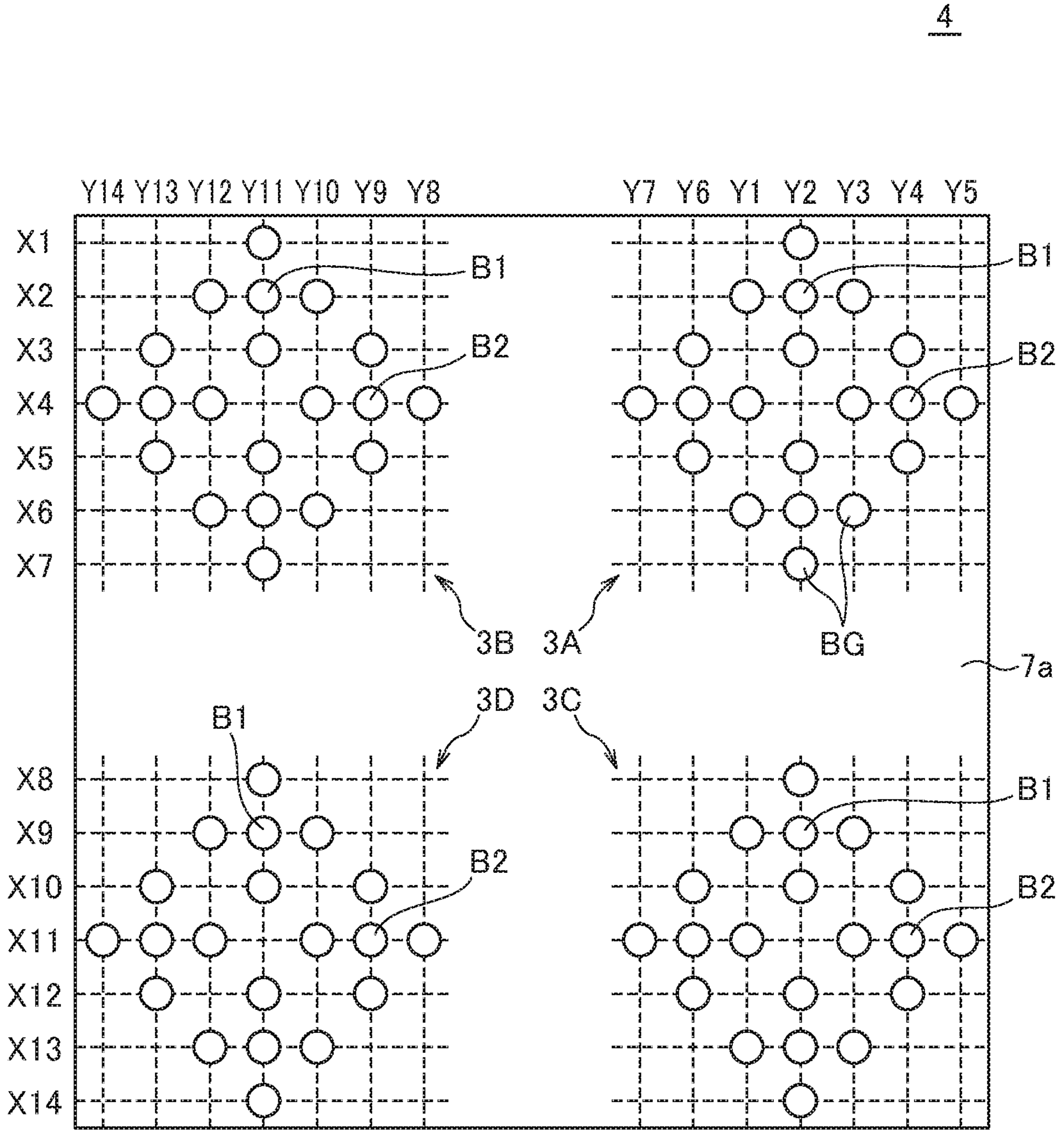
FIG. 19 is a schematic plan view for explaining the layout of the solder balls B in the antenna module 4 according to the fourth embodiment.

FIG. 18 is a schematic perspective view illustrating the outer appearance of an antenna module 4 according to a fourth embodiment of the present disclosure. FIG. 19 is a schematic plan view for explaining the layout of the solder balls B in the antenna module 4 according to the fourth embodiment.

As illustrated in FIG. 18, the antenna module 4 according to the fourth embodiment has a structure in which four elements 3A to 3D each having substantially the same structure as those of the conductor patterns included in the antenna module 3 are laid out in an array in the x- and y-directions. The four elements included in the antenna module 4 need not have completely the same structure as those of the antenna module 3 and may be partly different therefrom. The element 3A includes a first antenna element 80A, the element 3B includes a second antenna element 80B, the element 3C includes a third antenna element 80C, and the element 3D includes a fourth antenna element 80D. By thus laying out the plurality of elements 3A to 3D having substantially the same structure as those of the antenna module 3, it is possible to control a beam radiation direction under phase control.

As illustrated in FIG. 19, the solder balls B provided in each of the elements 3A to 3D are laid out in the same manner as the solder balls B provided in the antenna module 3. That is, in the element 3A, the first signal ball B1 is disposed at the intersection between the row virtual line X2 and the column virtual line Y2, and the second signal ball B2 is disposed at the intersection between the row virtual line X4 and the column virtual line Y4; in the element 3B, the first signal ball B1 is disposed at the intersection between the row virtual line X2 and the column virtual line Y11, and the second signal ball B2 is disposed at the intersection between the row virtual line X4 and the column virtual line Y9; in the element 3C, the first signal ball B1 is disposed at the intersection between the row virtual line X9 and the column virtual line Y2, and the second signal ball B2 is disposed at the intersection between the row virtual line X11 and the column virtual line Y4; and in the element 3D, the first signal ball B1 is disposed at the intersection between the row virtual line X9 and the column virtual line Y11, and the second signal ball B2 is disposed at the intersection between the row virtual line X11 and the column virtual line Y9. All the other solder balls B are ground balls BG.

Figure 20A:
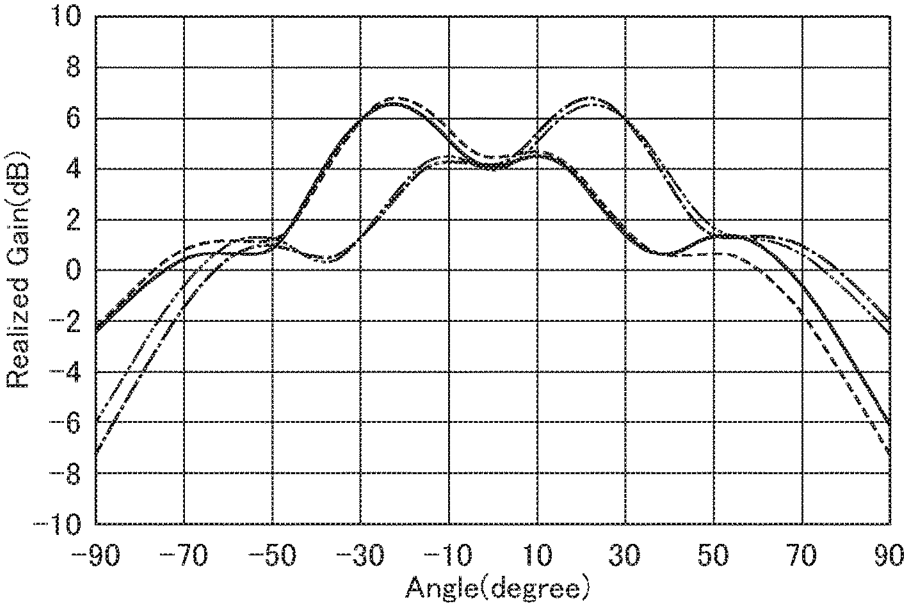
FIGS. 20A and 20B are graphs each illustrating the characteristics of the antenna module 4 according to the fourth embodiment.
Figure 20B:
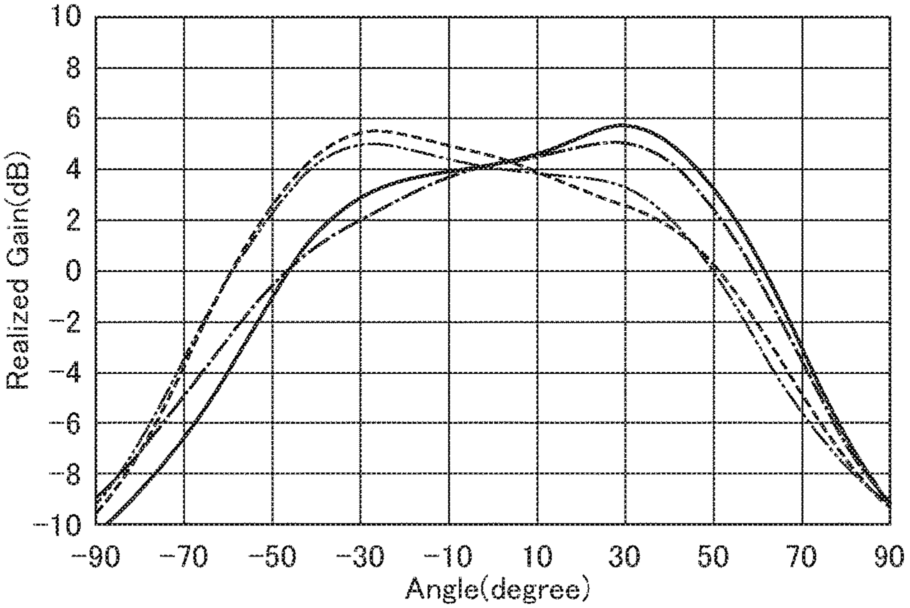
Figure 21A:
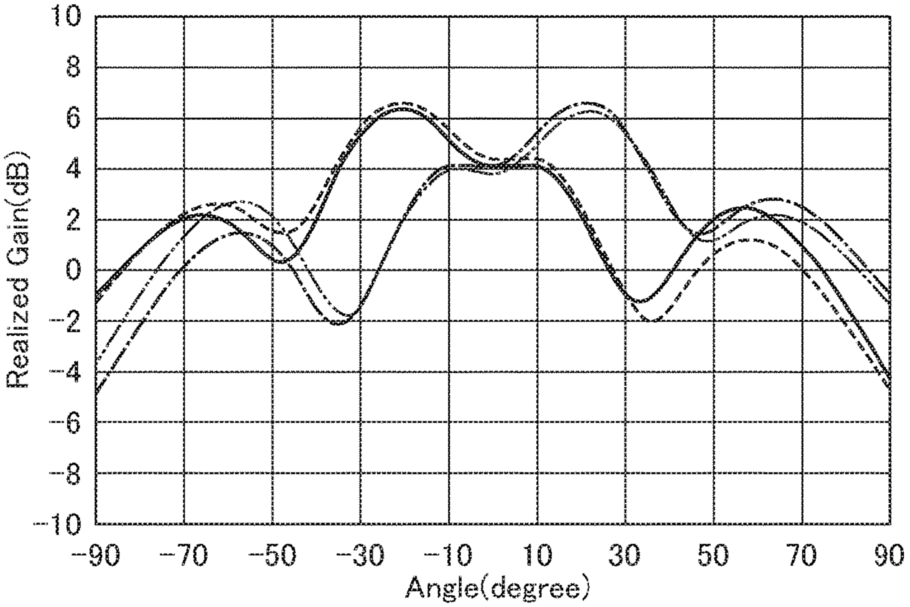
FIGS. 21A and 21B are graphs each illustrating the characteristics of an antenna module according to a second comparative example.
Figure 21B:
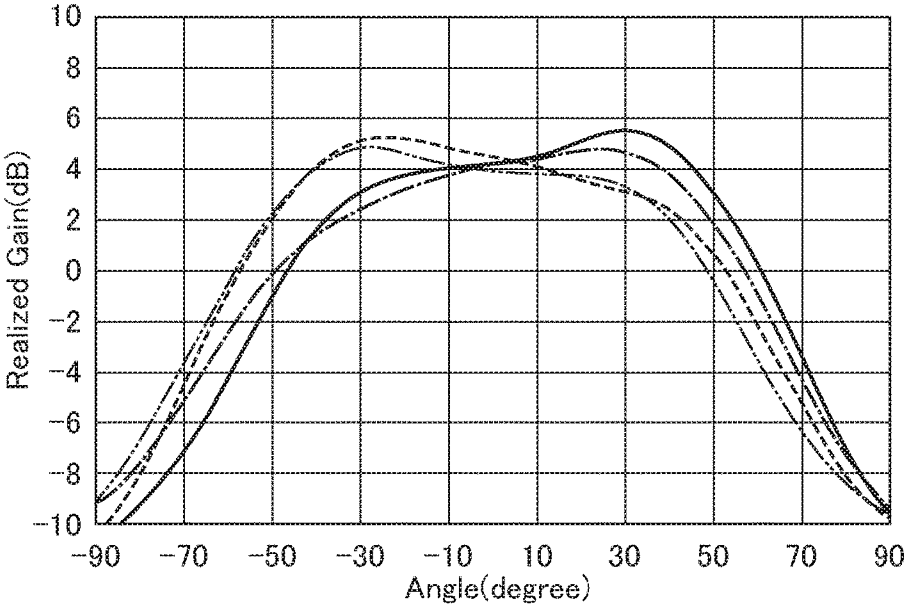

FIGS. 20A and 20B are graphs each illustrating the characteristics of the antenna module 4 according to the fourth embodiment. FIGS. 21A and 21B are graphs each illustrating the characteristics of an antenna module according to a second comparative example. FIGS. 20A and 21A illustrate a radiation pattern on the E surface, and FIGS. 20B and 21B illustrate a radiation pattern on the H surface. Although not illustrated, the antenna module according to the second comparative example is an antenna module in which the solder ball B is disposed at all the intersections illustrated in FIG. 19, that is, the ground ball BG is additionally provided at the intersections absent of the solder ball B in FIG. 19.

As illustrated in FIGS. 20A, 20B and FIGS. 21A, 21B, as compared to the second comparative example, the antenna module 4 according to the fourth embodiment can suppress a reduction in the gain at one null point between the main lobe and unnecessary side lobes of a radiation pattern on the E surface of each antenna module and reduce the gain of the side lobes on both sides of the main lobe.

Figure 22:
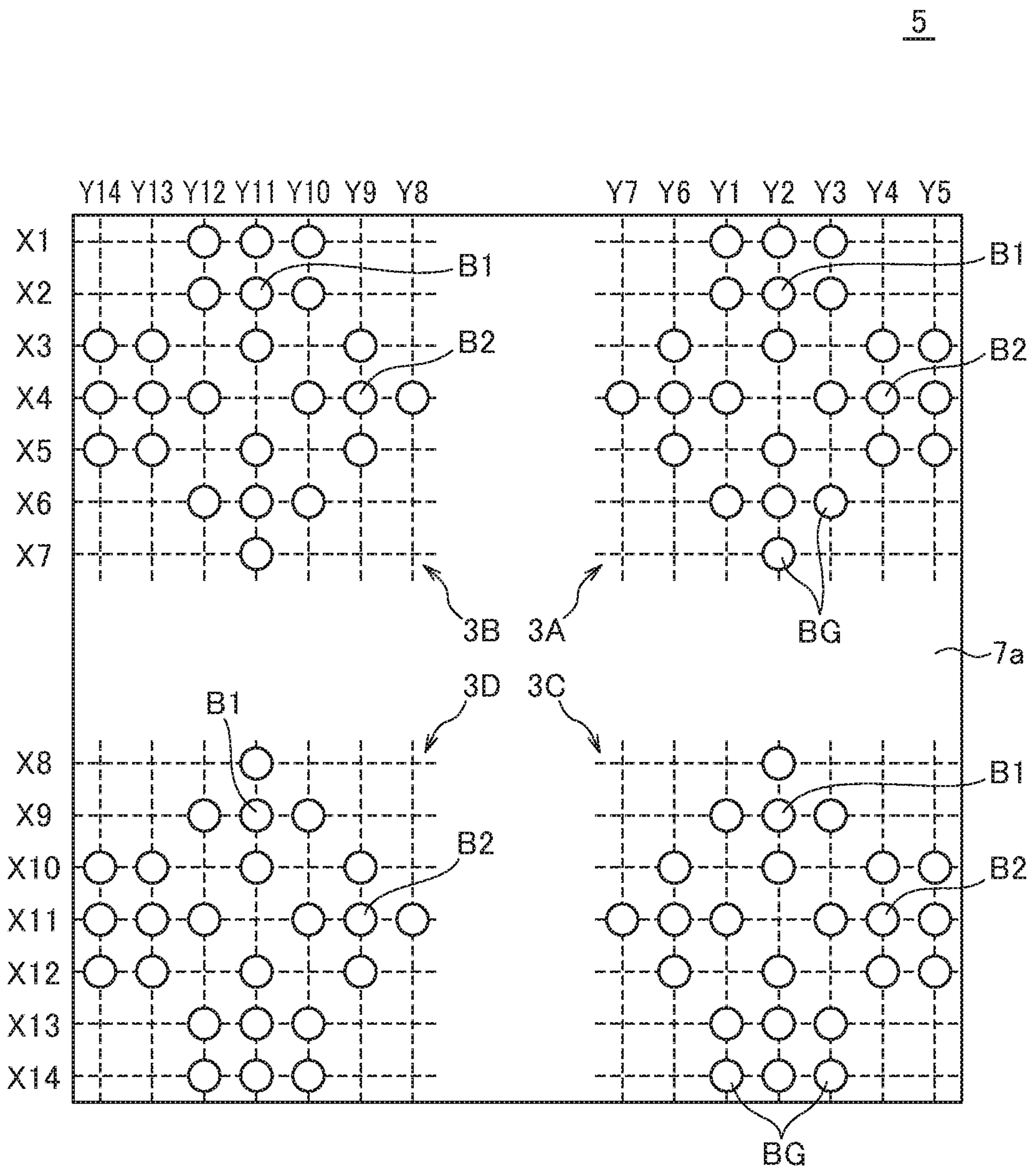
FIG. 22 is a schematic plan view for explaining the layout of the solder balls B in an antenna module 5 according to a fifth embodiment of the present disclosure.

FIG. 22 is a schematic plan view for explaining the layout of the solder balls B in an antenna module 5 according to a fifth embodiment of the present disclosure.

As illustrated in FIG. 22, the antenna module 5 according to the fifth embodiment has a configuration in which several ground balls BG are added to the antenna module 4 according to the fourth embodiment. Specifically, the ground balls BG of the solder ball B are added to the intersections between the row virtual line X1 and the column virtual lines Y1, Y3, Y10, and Y12, the intersections between the row virtual line X14 and the column virtual lines Y1, Y3, Y10, and Y12, the intersections between the column virtual line Y5 and the row virtual lines X3, X5, X10, and X12, and the intersections between the column virtual line Y14 and the row virtual lines X3, X5, X10, and X12. In this example, the row virtual lines X1 and X14 of the plurality of row virtual lines X1 to X14 are positioned at the outermost end portions of the antenna module 5 in the y-direction, and the column virtual lines Y5 and Y14 of the plurality of column virtual lines Y1 to Y14 are positioned at the outermost end portions of the antenna module 5 in the x-direction.

When the antenna module 5 according to the fifth embodiment is mounted on a circuit board, thermal stress is applied to each solder ball B due to a difference in thermal expansion coefficient between the circuit board and the element body 7. The solder ball B positioned at the outermost end portion of the antenna module 5 is subjected to higher thermal stress than other solder balls B. However, in the present embodiment, several ground balls BG are additionally provided along the row virtual lines X1, X14 and column virtual lines Y5, Y14 positioned at the outermost end portion, so that it is possible to distribute the thermal stress due to the difference in thermal expansion coefficient as compared to the antenna module 4 according to the fourth embodiment.

Figure 23A:
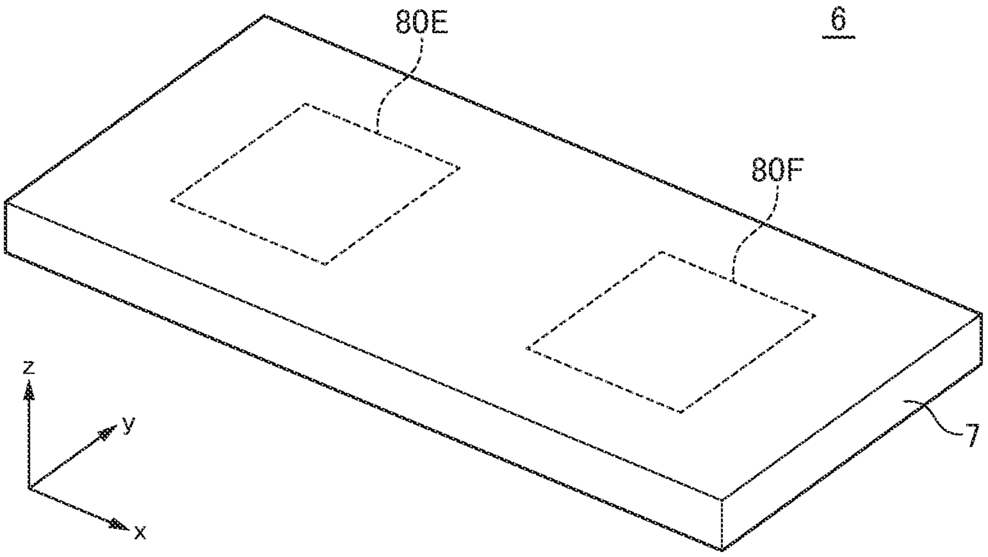
FIGS. 23A and 23B are schematic perspective views each illustrating the outer appearance of an antenna module 6 according to a sixth embodiment of the present disclosure.
Figure 23B:
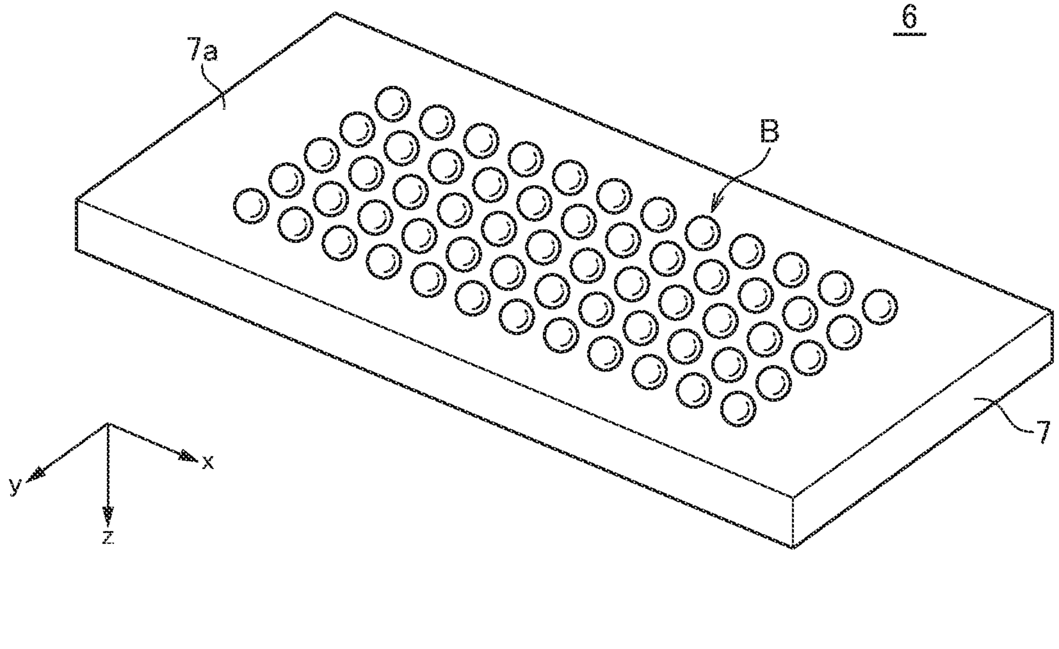

FIGS. 23A and 23B are schematic perspective views each illustrating the outer appearance of an antenna module 6 according to a sixth embodiment of the present disclosure. FIG. 23A is a top view, and FIG. 23B is a view from the mounting surface side.

As illustrated in FIGS. 23A and 23B, the antenna module 6 according to the sixth embodiment has a first antenna element 80E and a second antenna element 80F in the element body 7. The first and second antenna elements 80E and 80F are arranged in the x-direction. Thus, the element body 7 has a rectangular planar shape with the x-direction and the y-direction defined as the long-side direction and the short-side direction, respectively. A plurality of solder balls B are provided on the mounting surface 7*a* of the element body 7.

Figure 24:
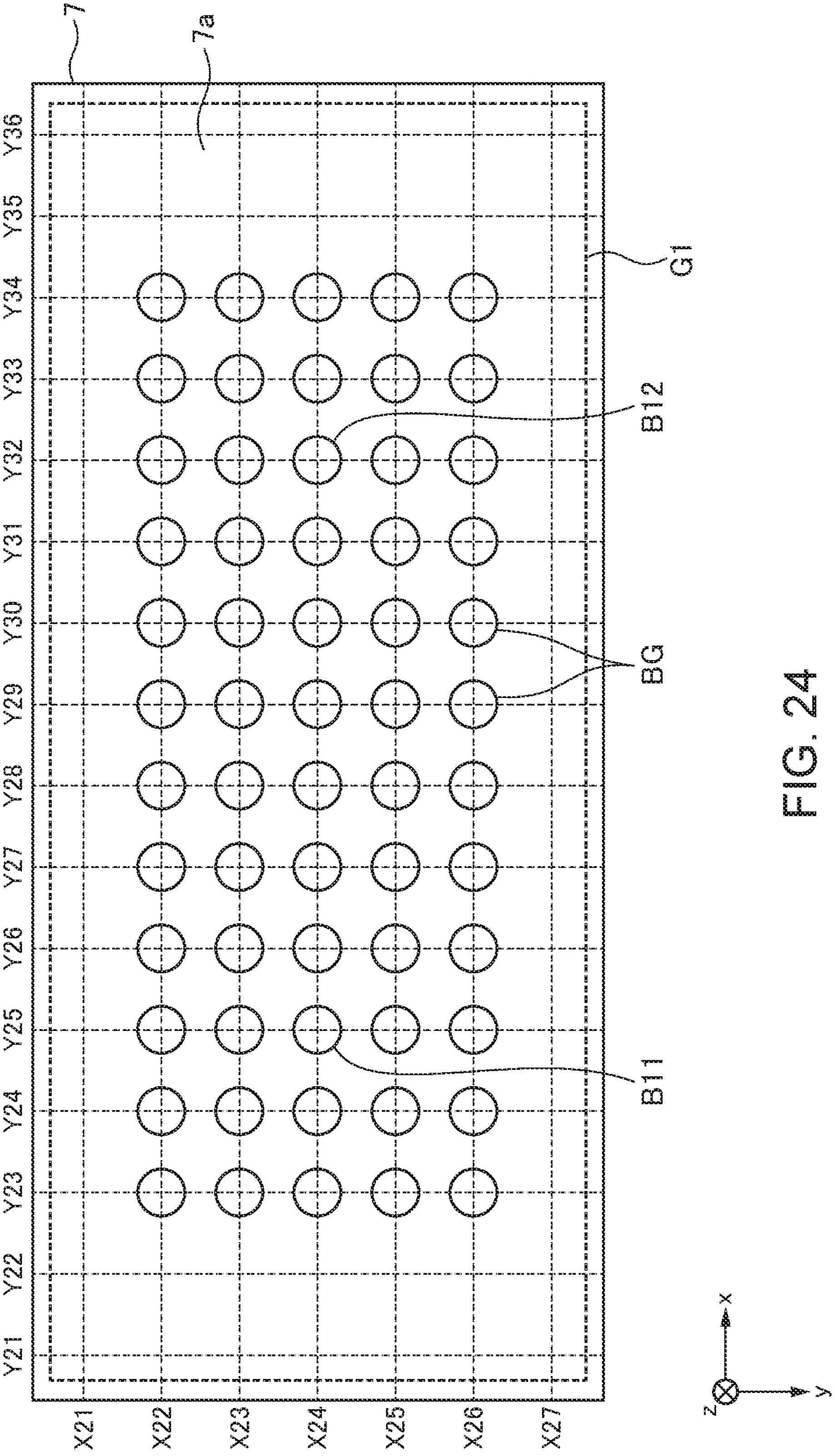
FIG. 24 is a schematic plan view for explaining the layout of the solder balls B in the antenna module 6.

FIG. 24 is a schematic plan view for explaining the layout of the solder balls B in the antenna module 6.

As illustrated in FIG. 24, in the antenna module 6, row virtual lines X21 to X27 and column virtual lines Y21 to Y36 are defined on the mounting surface 7*a* of the element body 7. The row virtual lines X21 to X27 extend in the x-direction and arranged at equal intervals in the y-direction. The column virtual lines Y21 to Y36 extend in the y-direction and arranged at equal intervals in the x-direction. The area in which the row virtual lines X21 to X27 and column virtual lines Y21 to Y36 are defined may be the entire surface of the mounting surface 7*a* or an area overlapping the ground pattern G1 as seen in a plan view from the z-direction.

In the present embodiment, the solder ball B is disposed at the intersections between the row virtual lines X22 to X26 and the column virtual lines Y23 to Y34. No solder ball B is disposed on the row virtual lines X21 and X27 and column virtual lines Y21, Y22, Y35, and Y36. Of the solder balls B, a first signal ball B11 is disposed at the intersection between the row virtual line X24 and the column virtual line Y25, and a second signal ball B12 is disposed at the intersection between the row virtual line X24 and the column virtual line Y32. The first signal ball B11 is a terminal for transmitting/receiving, for example, a vertically polarized signal, and the second signal ball B12 is a terminal for transmitting/receiving, for example, a horizontally polarized signal. The other solder balls B are ground balls BG for supplying a ground potential.

Figure 25:
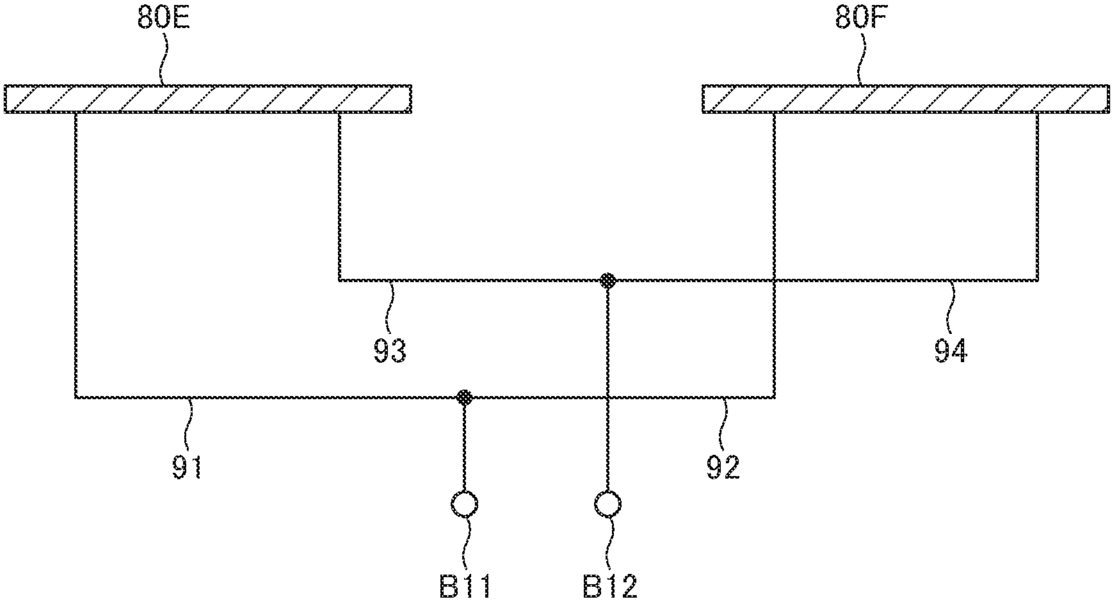
FIG. 25 is a schematic view for explaining the connection relation between the first and second signal balls B11 and B12 and the first and second antenna elements 80E and 80F.

FIG. 25 is a schematic view for explaining the connection relation between the first and second signal balls B11 and B12 and the first and second antenna elements 80E and 80F.

As illustrated in FIG. 25, in the present embodiment, the first signal ball B11 is coupled to the first and second antenna elements 80E and 80F respectively through branch wirings 91 and 92, and the second signal ball B12 is coupled to the first and second antenna elements 80E and 80F respectively through branch wirings 93 and 94. As a result, a signal (for example, a vertically polarized signal) input to the first signal ball B11 is supplied in common to the first and second antenna elements 80E and 80F, and a signal (for example, a horizontally polarized signal) input to the second signal ball B12 is supplied in common to the first and second antenna elements 80E and 80F. In the present embodiment, a band-pass filter may be inserted between the first signal ball B11 and the branch wirings 91 and 92 and between the second signal ball B12 and the branch wirings 93 and 94. Further, the branch wirings 91 and 93 may be connected and coupled to the first antenna element 80E directly or through a feed electrode. Similarly, the branch wirings 92 and 94 may be connected and coupled to the second antenna element 80F directly or through a feed electrode.

In the antenna module 6 according to the present embodiment, the x-direction is defined as the long-side direction of the element body 7, so that when the antenna module 6 is mounted on a circuit board, thermal stress generated due to a difference in thermal expansion coefficient between the circuit board and the element body 7 becomes highest in the x-direction. Therefore, when the solder balls B are disposed on the column virtual lines Y21 and Y36 positioned at both ends in the x-direction, those solder balls B are subjected to high thermal stress, mounting reliability may deteriorate. Considering this point, in the present embodiment, no solder ball B is disposed on the two column virtual lines Y21 and Y22 positioned at one end portion in the x-direction and two column virtual lines Y35 and Y36 positioned at the other end portion in the x-direction. This can increase mounting reliability while reducing the number of solder balls to be used. The reason why no solder ball B is disposed on the column virtual lines Y22 and Y35 which are each the second column from the end portions is to further increase mounting reliability. Further, in the example illustrated in FIG. 24, no solder ball is disposed also on the row virtual lines X21 and X27 which are each positioned at the end portion in the y-direction, so that it is possible to suppress deterioration in mounting reliability due to thermal stress in the y-direction.

As described above, in the present embodiment, the ground balls BG which do not significantly contribute to the characteristics of the antenna module are omitted, so that it is possible to increase mounting reliability while reducing the number of solder balls to be used.

Figure 26:
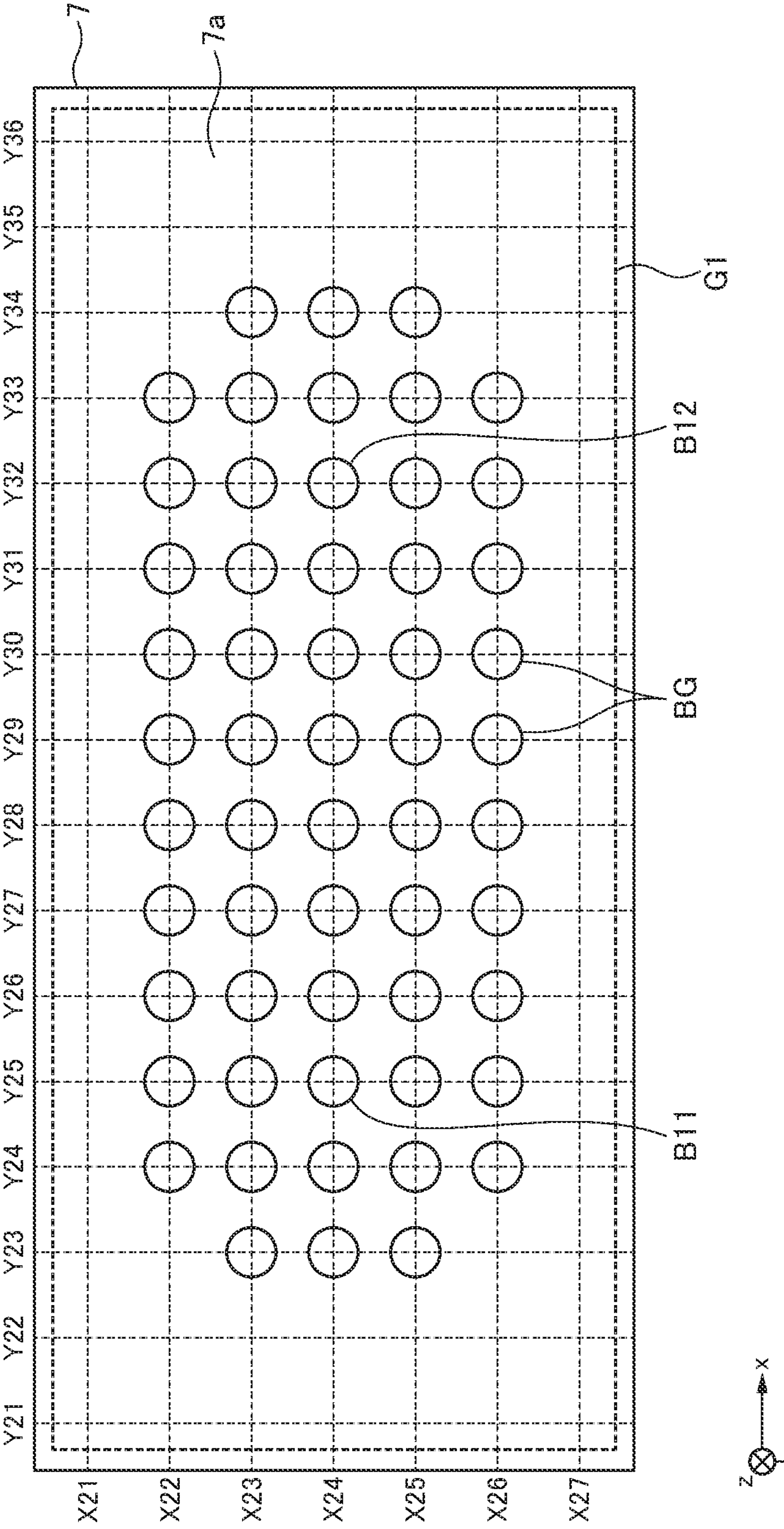
FIG. 26 is a schematic plan view for explaining a first modification of the layout of the solder balls B in the antenna module 6.
Figure 26:
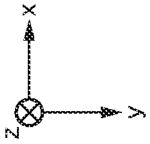

FIG. 26 is a schematic plan view for explaining a first modification of the layout of the solder balls B in the antenna module 6. The layout according to the first modification illustrated in FIG. 26 differs from the layout illustrated in FIG. 24 in that the ground balls BG are omitted at the intersections between the row virtual line X22 and the column virtual lines Y23 and Y34 and the intersections between the row virtual line X26 and the column virtual lines Y23 and Y34. By thus omitting the ground balls BG at the corners that do not significantly contribute to the characteristics of the antenna module, the number of solder balls to be used can be further reduced.

Figure 27:
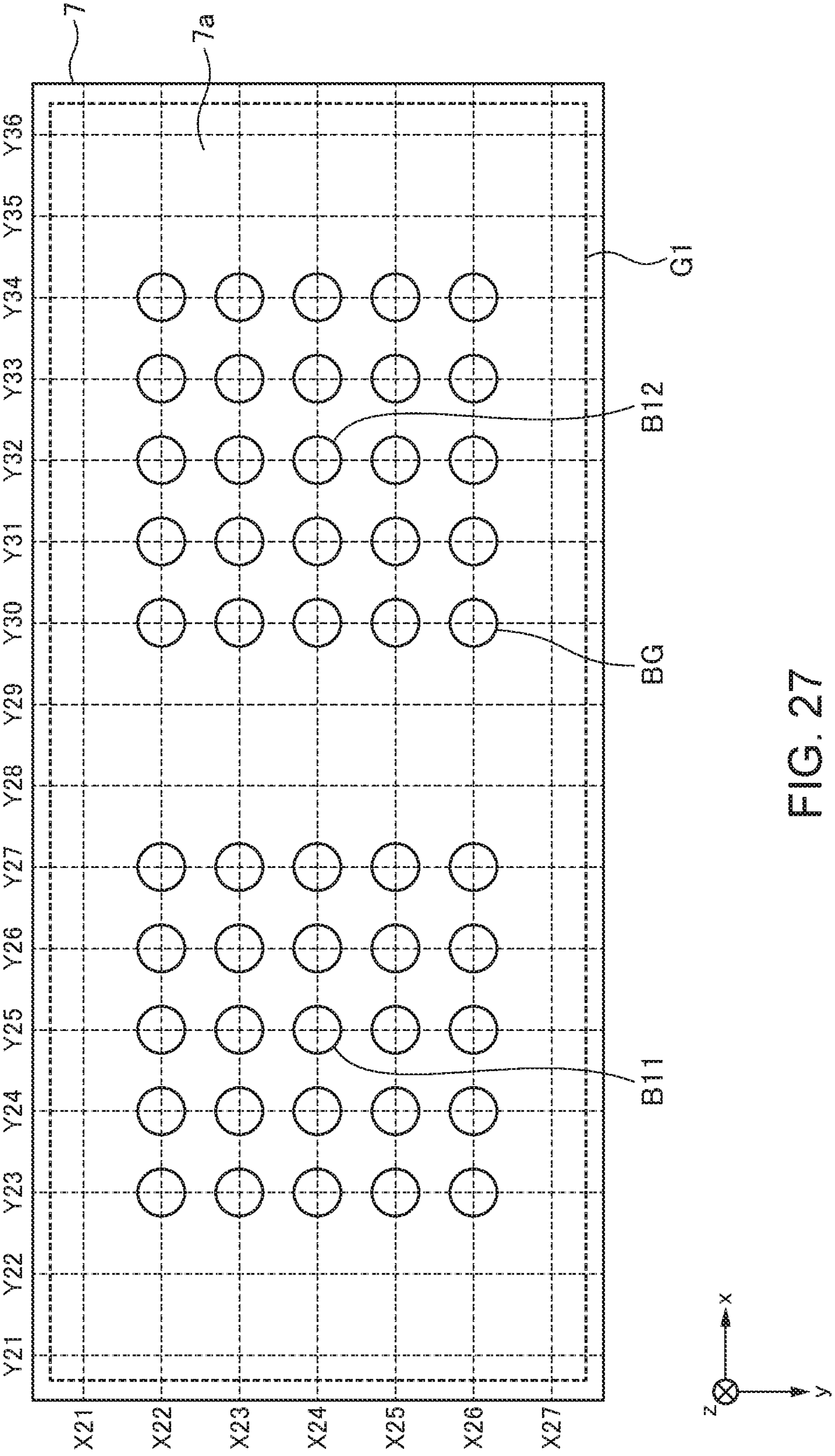
FIG. 27 is a schematic plan view for explaining a second modification of the layout of the solder balls B in the antenna module 6.

FIG. 27 is a schematic plan view for explaining a second modification of the layout of the solder balls B in the antenna module 6. The layout according to the second modification illustrated in FIG. 27 differs from the layout illustrated in FIG. 24 in that the ground balls BG on the column virtual lines Y28 and Y29 are omitted. The column virtual lines Y28 and Y29 are positioned between the first and second antenna elements 80E and 80F as seen in a plan view from the z-direction and do not overlap them. That is, the ground balls BG disposed on the column virtual lines Y28 and Y29 positioned between the first and second antenna elements 80E and 80F are distant from the first and second signal balls B11 and B12 and thus do not contribute to the characteristics of the antenna module. Thus, according to the second modification, it is possible to further reduce the number of solder balls to be used without significantly changing the characteristics of the antenna module.

Figure 28:
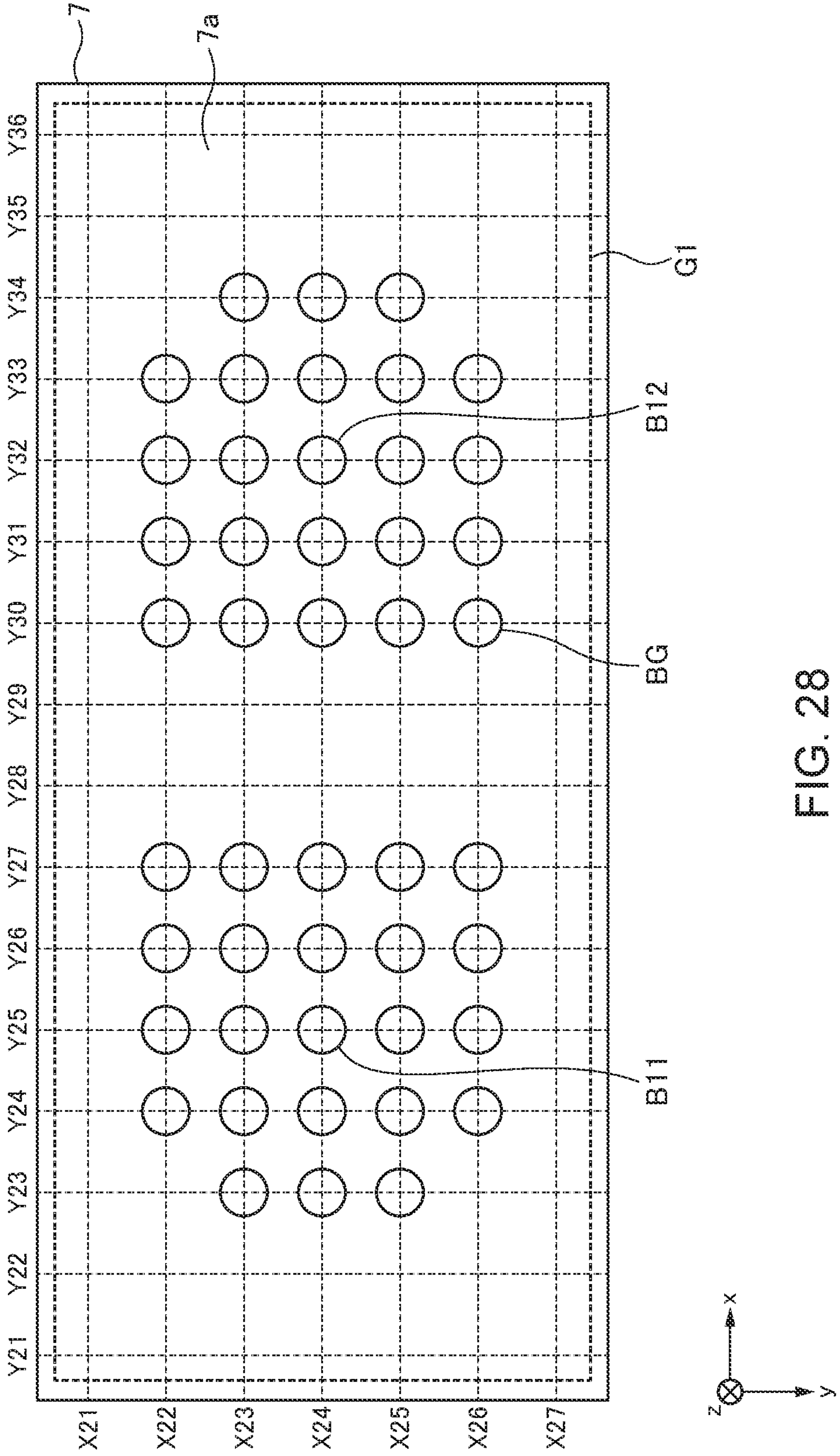
FIG. 28 is a schematic plan view for explaining a third modification of the layout of the solder balls B in the antenna module 6.

FIG. 28 is a schematic plan view for explaining a third modification of the layout of the solder balls B in the antenna module 6. The layout according to the third modification illustrated in FIG. 28 differs from the layout illustrated in FIG. 27 in that the ground balls BG are omitted at the intersections between the row virtual line X22 and the column virtual lines Y23 and Y34 and the intersections between the row virtual line X26 and the column virtual lines Y23 and Y34. By thus omitting the ground balls BG at the corners that do not significantly contribute to the characteristics of the antenna module, the number of solder balls to be used can be further reduced.

While the preferred embodiments of the present disclosure have been described, the present disclosure is not limited to the above embodiments, and various modifications may be made within the scope of the present disclosure, and all such modifications are included in the scope of the present disclosure.

The technology according to the present disclosure includes the following configuration examples, but not limited thereto.

An antenna module according to the present disclosure includes an element body including a first antenna element and a plurality of solder balls provided on the surface of the element body. The plurality of solder balls are disposed at intersections between a plurality of row virtual lines extending in a first direction on the surface of the element body and arranged in a second direction perpendicular to the first direction and a plurality of column virtual lines extending in the second direction on the surface of the element body and arranged in the first direction. The plurality of row virtual lines include first to third row virtual lines arranged in this order in the second direction. The plurality of column virtual lines include first to third column virtual lines arranged in this order in the first direction. The plurality of solder balls include a first signal ball disposed at the intersection between the second row virtual line and the second column virtual line and coupled to the first antenna element and a plurality of ground balls for supplying a ground potential. The plurality of ground balls include first to fourth ground balls disposed, out of a plurality of intersections between the first to third row virtual lines and the first to third column virtual lines, at any of the intersections other than those at which the first signal ball is disposed. No solder ball is disposed, out of the intersections between the plurality of row and column virtual lines, at least at some of the plurality of intersections other than those at which the first signal ball or first to fourth ground balls are disposed. With this configuration, the number of solder balls to be used can be reduced.

The first ground ball may be disposed at the intersection between the first row virtual line and the second column virtual line, the second ground ball may be disposed at the intersection between the second row virtual line and the first column virtual line, the third ground ball may be disposed at the intersection between the second row virtual line and the third column virtual line, and the fourth ground ball may be disposed at the intersection between the third row virtual line and the second column virtual line. With this configuration, the ground balls are disposed at positions close to the first signal ball, so that it is possible to reduce the number of solder balls to be used while achieving desired characteristics.

No ground ball may be disposed at least at some of the intersection between the first row virtual line and the first column virtual line, the intersection between the first row virtual line and the third column virtual line, the intersection between the third row virtual line and the first column virtual line, and the intersection between the third row virtual line and the third column virtual line. This can further reduce the number of solder balls to be used.

The plurality of ground balls may further include fifth to eighth ground balls disposed at 180-degree rotationally symmetric positions to the first to fourth ground balls with the center of the first antenna element as the rotation axis. This improves antenna characteristics.

The plurality of solder balls may further include a second signal ball disposed at the intersection between a predetermined row virtual line of the plurality of row virtual lines that is different from the first to third row virtual lines and a predetermined column virtual line of the plurality of column virtual lines that is different from the first to third column virtual lines and coupled to the first antenna element, and the plurality of ground balls may further include fifth and sixth ground balls disposed at the intersections between the predetermined row virtual line and the column virtual lines of the plurality of column virtual lines that are positioned on both sides of the predetermined column virtual line, and seventh and eighth ground balls disposed at the intersections between the predetermined column virtual line and the row virtual lines of the plurality of row virtual lines that are positioned on both sides of the predetermined row virtual line. With this configuration, a dual polarization antenna module can be achieved.

The first and second signal balls may be disposed at 90-degree rotationally symmetric positions with the center of the first antenna element as the rotation axis. This allows the first antenna element to radiate a horizontally polarized signal and a vertically polarized signal.

The plurality of ground balls may further include ninth to 12th ground balls disposed at 180-degree rotationally symmetric positions to the first to fourth ground balls with the center of the first antenna element as the rotation axis and 13th to 16th ground balls disposed at 180-degree rotationally symmetric positions to the fifth to eighth ground balls with the center of the first antenna element as the rotation axis. This improves antenna characteristics.

The element body may further include second to fourth antenna elements, the first to fourth antenna elements may be arranged in an array in the first and second directions, and the plurality of solder balls may be provided on each of the second to fourth antenna elements and may include a plurality of solder balls arranged in the same manner as the first signal ball and first to fourth ground balls. This makes it possible to control a beam radiation direction under phase control.

The first row virtual line of the plurality of row virtual lines may be positioned at the outermost end portion of the antenna module in the second direction, the solder balls may be disposed at the intersection between the first row virtual line and the first column virtual line and the intersection between the first row virtual line and the third column virtual line, and no solder ball may be disposed at the intersection between the third row virtual line and the first column virtual line and the intersection between the third row virtual line and the third column virtual line. This makes it possible to distribute thermal stress due to a difference in thermal expansion coefficient.

The element body may further include a second antenna element, the first and second antenna elements may be arranged in the first direction, the plurality of solder balls may further include a second signal ball coupled to the second antenna element, and no solder ball may be disposed on column virtual lines positioned at both ends of the plurality of column virtual lines. This makes it possible to suppress a reduction in reliability due to thermal stress applied in the first direction while reducing the number of solder balls to be used.

No solder ball may be disposed on a column virtual line of the plurality of column virtual lines that is positioned between the first and second antenna elements in a plan view. This can further reduce the number of solder balls to be used.

What is claimed is:

1. An antenna module comprising:

an element body including a first antenna element; and a plurality of solder balls provided on a surface of the element body, wherein the plurality of solder balls are disposed at intersections between a plurality of row virtual lines extending in a first direction on the surface of the element body and arranged in a second direction perpendicular to the first direction and a plurality of column virtual lines extending in the second direction on the surface of the element body and arranged in the first direction, wherein the plurality of row virtual lines include first to third row virtual lines arranged in this order in the second direction, wherein the plurality of column virtual lines include first to third column virtual lines arranged in this order in the first direction, wherein the plurality of solder balls include a first signal ball disposed at an intersection between the second row virtual line and the second column virtual line and coupled to the first antenna element and a plurality of ground balls for supplying a ground potential, wherein the plurality of ground balls include first to fourth ground balls disposed, wherein the first ground ball is disposed at an intersection between the first row virtual line and the second column virtual line, wherein the second ground ball is disposed at an intersection between the second row virtual line and the first column virtual line, wherein the third ground ball is disposed at an intersection between the second row virtual line and the third column virtual line, wherein the fourth ground ball is disposed at an intersection between the third row virtual line and the second column virtual line, wherein no ground ball is disposed at least at some of an intersection between the first row virtual line and the first column virtual line, an intersection between the first row virtual line and the third column virtual line, an intersection between the third row virtual line and the first column virtual line, and an intersection between the third row virtual line and the third column virtual line, and wherein no solder ball is disposed, out of the intersections between the plurality of row and column virtual lines, at least at some of the plurality of intersections other than those at which the first signal ball or first to fourth ground balls are disposed.

2. An antenna module comprising:

an element body including a first antenna element; and a plurality of solder balls provided on a surface of the element body, wherein the plurality of solder balls are disposed at intersections between a plurality of row virtual lines extending in a first direction on the surface of the element body and arranged in a second direction perpendicular to the first direction and a plurality of column virtual lines extending in the second direction on the surface of the element body and arranged in the first direction, wherein the plurality of row virtual lines include first to third row virtual lines arranged in this order in the second direction, wherein the plurality of column virtual lines include first to third column virtual lines arranged in this order in the first direction, wherein the plurality of solder balls include a first signal ball disposed at an intersection between the second row virtual line and the second column virtual line and coupled to the first antenna element and a plurality of ground balls for supplying a ground potential, wherein the plurality of ground balls include first to fourth ground balls disposed, out of a plurality of intersections between the first to third row virtual lines and the first to third column virtual lines, at any of intersections other than those at which the first signal ball is disposed, wherein the plurality of ground balls further include fifth to eighth ground balls disposed at 180-degree rotationally symmetric positions to the first to fourth ground balls with a center of the first antenna element as a rotation axis, and wherein no solder ball is disposed, out of the intersections between the plurality of row and column virtual lines, at least at some of the plurality of intersections other than those at which the first signal ball or first to eighth ground balls are disposed.

3. The antenna module as claimed in claim 1, wherein the plurality of solder balls further include a second signal ball disposed at an intersection between a predetermined row virtual line of the plurality of row virtual lines that is different from the first to third row virtual lines and a predetermined column virtual line of the plurality of column virtual lines that is different from the first to third column virtual lines and coupled to the first antenna element, and wherein the plurality of ground balls further include fifth and sixth ground balls disposed at intersections between the predetermined row virtual line and column virtual lines of the plurality of column virtual lines that are positioned on both sides of the predetermined column virtual line, and seventh and eighth ground balls disposed at intersections between the predetermined column virtual line and row virtual lines of the plurality of row virtual lines that are positioned on both sides of the predetermined row virtual line.

4. The antenna module as claimed in claim 3, wherein the first and second signal balls are disposed at 90-degree rotationally symmetric positions with a center of the first antenna element as a rotation axis.

5. The antenna module as claimed in claim 4, wherein the plurality of ground balls further include ninth to 12th ground balls disposed at 180-degree rotationally symmetric positions to the first to fourth ground balls with the center of the first antenna element as the rotation axis and 13th to 16th ground balls disposed at 180-degree rotationally symmetric positions to the fifth to eighth ground balls with the center of the first antenna element as the rotation axis.

6. The antenna module as claimed in claim 1, wherein the element body further includes second to fourth antenna elements, wherein the first to fourth antenna elements are arranged in an array in the first and second directions, and wherein the plurality of solder balls are provided on each of the second to fourth antenna elements and include a plurality of solder balls arranged in a same manner as the first signal ball and first to fourth ground balls.

7. The antenna module as claimed in claim 6, wherein the first row virtual line of the plurality of row virtual lines is positioned at an outermost end portion of the antenna module in the second direction, wherein the solder balls are disposed at an intersection between the first row virtual line and the first column virtual line and an intersection between the first row virtual line and the third column virtual line, and wherein no solder ball is disposed at an intersection between the third row virtual line and the first column virtual line and an intersection between the third row virtual line and the third column virtual line.

8. An antenna module comprising:

an element body including a first antenna element and a second antenna element; and a plurality of solder balls provided on a surface of the element body, wherein the plurality of solder balls are disposed at intersections between a plurality of row virtual lines extending in a first direction on the surface of the element body and arranged in a second direction perpendicular to the first direction and a plurality of column virtual lines extending in the second direction on the surface of the element body and arranged in the first direction, wherein the first and second antenna elements are arranged in the first direction, wherein the plurality of row virtual lines include first to third row virtual lines arranged in this order in the second direction, wherein the plurality of column virtual lines include first to third column virtual lines arranged in this order in the first direction, wherein the plurality of solder balls include a first signal ball disposed at an intersection between the second row virtual line and the second column virtual line and coupled to the first antenna element and a plurality of ground balls for supplying a ground potential, wherein the plurality of solder balls further include a second signal ball coupled to the second antenna element, wherein the plurality of ground balls include first to fourth ground balls disposed, out of a plurality of intersections between the first to third row virtual lines and the first to third column virtual lines, at any of intersections other than those at which the first signal ball is disposed, wherein no solder ball is disposed, out of the intersections between the plurality of row and column virtual lines, at least at some of the plurality of intersections other than those at which the first signal ball or first to fourth ground balls are disposed, and wherein no solder ball is disposed on column virtual lines positioned at both ends of the plurality of column virtual lines.

9. The antenna module as claimed in claim 8, wherein no solder ball is disposed on a column virtual line of the plurality of column virtual lines that is positioned between the first and second antenna elements in a plan view.

* * * * *